(12) United States Patent
Okubo et al.

(10) Patent No.: US 9,033,562 B2
(45) Date of Patent: May 19, 2015

(54) VEHICLE HEADLAMP

(71) Applicant: ICHIKOH INDUSTRIES, LTD., Isehara-shi, Kanagawa-ken (JP)

(72) Inventors: Yasuhiro Okubo, Isehara (JP); Toshiya Abe, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 148 days.

(21) Appl. No.: 13/720,257

(22) Filed: Dec. 19, 2012

(65) Prior Publication Data

US 2013/0163267 A1 Jun. 27, 2013

(30) Foreign Application Priority Data

Dec. 27, 2011 (JP) .................................. 2011-286653
Dec. 27, 2011 (JP) .................................. 2011-286654

(51) Int. Cl.
*B60Q 1/04* (2006.01)
*F21S 8/10* (2006.01)

(52) U.S. Cl.
CPC ............... *B60Q 1/04* (2013.01); *F21S 48/1154* (2013.01); *F21S 48/1258* (2013.01); *F21S 48/1778* (2013.01); *F21S 48/321* (2013.01)

(58) Field of Classification Search
CPC ............ F21S 48/1778; F21S 48/1784; F21S 48/1768; F21S 48/1773; B60Q 1/1438

USPC .......................................... 362/539, 513, 514
See application file for complete search history.

(56) References Cited

U.S. PATENT DOCUMENTS

| | | | |
|---|---|---|---|
| 8,240,899 B2* | 8/2012 | Huang ........................ | 362/526 |
| 8,690,406 B2* | 4/2014 | Drenten et al. .............. | 362/545 |
| 2003/0081424 A1* | 5/2003 | Albou et al. .................. | 362/513 |
| 2006/0039158 A1* | 2/2006 | Kurz et al. .................... | 362/539 |
| 2010/0165654 A1* | 7/2010 | Okubo et al. ................. | 362/539 |

FOREIGN PATENT DOCUMENTS

| | | |
|---|---|---|
| JP | 2010-212089 A | 9/2010 |
| JP | 2011-113732 A | 6/2011 |

* cited by examiner

*Primary Examiner* — Peggy Neils
(74) *Attorney, Agent, or Firm* — Foley & Lardner LLP

(57) ABSTRACT

The present invention provides a semiconductor-type light source 2, a lens 35, a light control member 6, and a driving member 7. The lens 35 is made of a main lens portion 3 and an auxiliary lens portion 5. The light control member 6 is made of a light shading portion 60 and a light transmission portion 61. The driving member 7 is configured to position the light control member 6 in such a manner as to be changeably movable between a first location and a second location. As a result, the present invention is capable of obtaining a light distribution pattern for low beam LP and a light distribution pattern for high beam HP in a lamp unit of a lens direct emission and light distribution type.

4 Claims, 19 Drawing Sheets

(A)

(B)

VEHICLE HEADLAMP

CROSS REFERENCE TO RELATED APPLICATIONS

These applications claims priority of Japanese Patent Application No. 2011-286653 and Japanese Patent Application No. 2011-286654, filed on Dec. 27, 2011. The contents of the applications are incorporated herein by reference in their entirety.

BACKGROUND OF THE INVENTION

1. Field of the Invention

The present invention relates to a vehicle headlamp that is capable of causing light from a semiconductor-type light source to be incident to a lens, and from the lens, illuminating the incident light as a light distribution pattern for low beam or a light distribution pattern for a high beam forward of a vehicle.

2. Description of the Related Art vehicle headlamps of such a type are conventionally known (for example, Japanese Unexamined Patent Application Publication No. 2010-212089 and Japanese Unexamined Patent Application Publication No. 2011-113732). Hereinafter, these two conventional vehicle headlamps will be described.

A conventional vehicle headlamp of Japanese Unexamined Patent Application Publication No. 2010-212089 is provided with: a semiconductor light emitting element; a projection lens; a light guide member; a movable light shading member; and an actuator configured to move the movable light shading member. According to the conventional vehicle headlamp of Japanese Unexamined Patent Application Publication No. 2010-212089, when the movable light shading member is positioned in a non-shading location, light from the semiconductor light emitting element is caused to be incident to a respective one of the projection lens and the light guide member and then the incident light is illuminated forward of a vehicle as a light distribution pattern for side zone from the projection lens, and is illuminated forward of a vehicle as a light distribution pattern for center zone from the light guide member. Alternatively, when the movable light shading member is positioned in a shading position, light that is caused to be incident from the semiconductor light emitting element to the light guide member is shaded by means of the movable light shading member; and therefore, only a light distribution pattern for side zone from the projection lens is illuminated forward of the vehicle. In this manner, a light distribution pattern for high beam and a light distribution pattern for split high beam (a light distribution pattern for two-split high beam) can be obtained.

A conventional headlamp of Japanese Unexamined Patent Application Publication No. 2011-113732 is provided with: a light source; a lens; a first reflection surface; and a second reflection surface. According to the conventional headlamp of vehicle headlamp of Japanese Unexamined Patent Application Publication No. 2011-113732, when the first reflection surface is positioned in an open location, light from a light source is transmitted through a lens and then the thus transmitted light is illuminated forward of a vehicle as a light distribution pattern for passing. When the first reflection surface is positioned in a shading position, the light from the light source is reflected on the first reflection surface. The reflected light is reflected on the second reflection surface, and is illuminated forward of the vehicle as a light distribution pattern for cruising beam.

However, the conventional vehicle headlamp of vehicle headlamp of Japanese Unexamined Patent Application Publication No. 2010-212089 is structured in such a manner as to obtain a light distribution pattern for high beam and a light distribution pattern for split high beam, thus making it impossible to obtain a light distribution pattern for low beam and a light distribution pattern for high beam. According to the conventional vehicle headlamp of Japanese Unexamined Patent Application Publication No. 2011-113732, means for forming a light distribution pattern for cruising beam are the first reflection surface and the second reflection surface; and therefore, such a headlamp cannot be applied to a lamp unit of such type of making light from a semiconductor-type light source incident to a lens and then from the lens, illuminating the incident light as a respective one of a light distribution pattern for low beam and a light distribution pattern for high beam forward of a vehicle (a lamp unit of a lens direct emission and light distribution type).

SUMMARY OF THE INVENTION

The present invention has been made the above described problem that a respective one of the conventional vehicle headlamps is provided in such a manner that the lamp unit of the lens direct emission and light distribution type) is capable of obtaining a light distribution pattern for low beam and a light distribution pattern for high beam.

A vehicle headlamp according to a first aspect of the present invention, comprising:

a semiconductor-type light source;

a lens configured to illuminate light from the semiconductor-type light source forward of a vehicle as a respective one of a light distribution pattern for low beam and a light distribution pattern for high beam;

a light control member; and a driving member configured to position the light control member so as to be changeably movable between a first location and a second location, wherein:

the light control member is made of a plate-shaped light shading portion that is disposed inside of the vehicle;

when the light control member is positioned in the first location, the light shading portion shades a part of the light from the semiconductor-type light source, causes remaining light to be incident to the lens, and illuminate the incident light from the lens forward of the vehicle, as the light distribution pattern for low beam; and when the light control member is positioned in the second location, the light shading portion causes the light from the semiconductor-type light source to be incident to the lens as is, and illuminates the incident light from the lens forward of the vehicle, as the light distribution pattern for high beam.

The vehicle headlamp according to a second aspect of the present invention, wherein: in the first aspect, the light control member is made of the light shading portion and a light transmission portion;

when the light control member is positioned in the first location, the light transmission portion causes the light from the semiconductor-type light source to be incident to the lens as is, and illuminates the incident light from the lens forward of the vehicle, as the light distribution pattern for low beam, when the light control member is positioned in the second location, the light control member changes an optical path of a part of the light from the semiconductor-type light source, causes the part of the light to be incident to the lens, and illuminates the incident part of the light from the lens, as the light distribution pattern for high beam.

A vehicle headlamp according to a third aspect of the present invention, comprising:

a semiconductor-type light source;

a lens that is made of a main lens portion and an auxiliary lens portion, a respective one of which is configured to illuminate light from the semiconductor-type light source forward of a vehicle, as a predetermined light distribution pattern;

a light control member that is made of a light shading portion and a light transmission portion; and a driving member configured to position the light control member so as to be changeably movable between a first location and a second location, wherein:

when the light control member is positioned in the first location, the light shading portion is positioned between the semiconductor-type light source and the auxiliary lens portion, and is configured to shade light that is caused to be incident from the semiconductor-type light source to the auxiliary lens portion;

the light control member is positioned in the second location, the light shading portion is positioned in a location other than between the semiconductor-type light source and the auxiliary lens portion, and is configured to cause the light from the semiconductor-type light source to be incident to the auxiliary lens portion;

when the light control member is positioned in the first location, the light transmission portion is positioned in a location other than between the semiconductor-type light source and the main lens portion, and is configured to cause the light from the semiconductor-type light source to be directly incident to the main lens portion, and when the light control member is positioned in the second location, the light transmission portion is positioned between the semiconductor-type light source and the main lens portion, and is configured to transmit the light from the semiconductor-type light source and then cause the transmitted light to directly incident to the main lens portion;

the main lens portion is configured to illuminate the light that is caused to be directly incident from the semiconductor-type light source, forward of the vehicle, as a light distribution pattern for low beam, and illuminate the light that is transmitted through the light transmission portion from the semiconductor-type light source, forward of the vehicle, as a light distribution pattern for high beam; and the auxiliary lens portion is configured to illuminate the light from the semiconductor-type light source, as a light distribution pattern for spot, forward of the vehicle and to a substantial center part of the light distribution pattern for high beam that is illuminated from the main lens portion.

A vehicle headlamp according to a fourth aspect of the present invention, comprising:

a semiconductor-type light source having a light emission surface;

a lens configured to cause light from the light emission surface of the semiconductor-type light source to be incident by means of an incidence surface and then illuminate the incident light forward of a vehicle, as a predetermined light distribution pattern;

a light shading portion that serves as a light control member; and a driving member configured to position the light shading portion so as to be changeably movable between a first location and a second location, wherein:

when the light shading portion is positioned in the first location, the light shading portion is configured to shade a part of light that is caused to be incident from the light emission surface of the semiconductor-type light source to the incidence surface of the lens, and when the light shading portion is positioned in the second location, the light shading portion is configured to cause a part of the light from the light emission surface of the semiconductor-type light source to be incident to the incidence surface, and when the light shading portion is positioned in the first location, the light shading portion is vertical to or is substantially vertical to the light emission surface of the semiconductor-type light source in a region that is surrounded by:

a line segment that connects a light shading start point of the incidence surface of the lens and a most distant point of the light emission surface of the semiconductor-type light source to each other;

a line segment that connects a light shading end point of the incidence surface of the lens and a most proximal point of the light emission surface of the semiconductor-type light source to each other;

a line segment that is vertical to or is substantially vertical to the light emission surface of the semiconductor-type light source, the line segment passing through the most proximal point of the light emission surface of the semiconductor-type light source; and the incidence surface of the lens.

The vehicle headlamp according to a fifth aspect of the present invention, wherein: in the fourth aspect, the semiconductor-type light source is fixed to a mount member, a housing groove portion is provided in the mount member, and the light shading portion is formed in a shape of a plate, and when the light shading portion is positioned in the second location, the light shading portion is housed in the housing groove portion.

A vehicle headlamp according to the first aspect of the present invention is provided in such a manner that when a light control member is positioned in a first location, a light shading portion shades a part of light from a semiconductor-type light source, the remaining light is caused to be incident to a lens, and from the lens, the incident light is illuminated forward of a vehicle, as a light distribution pattern for low beam alternatively, when the light control member is positioned in a second location, the light from the semiconductor-type light source is caused to be incident to a lens as it is, and from the lens, the incident light is illuminated forward of the vehicle, as a light distribution pattern for high beam. As a result, a lamp unit of a lens direct emission and light distribution type is capable of reliably obtaining a light distribution pattern for low beam and a light distribution pattern for high beam.

Further, the vehicle headlamp according to the first aspect of the present invention is provided in such a manner that a plate-shaped light shading portion configured to switch a light distribution pattern for low beam and a light distribution pattern for high beam is disposed inside of the vehicle. As a result, even at the time of emission of a light distribution pattern for low beam, peripheral light that is the light radiated from a semiconductor-type light source, the peripheral light being radiated outside of the vehicle, can be widely emitted laterally of the light distribution pattern for low beam (to a shoulder edge side on a road surface) as a lateral scattering light distribution pattern. In this manner, the light distribution pattern for low beam and the light distribution pattern for high beam can be switched in a state in which the lateral scattering light distribution pattern is maintained.

Furthermore, the vehicle headlamp according to the first aspect of the present invention is provided in such a manner that the plate-shaped light shading portion is disposed inside of the vehicle; and therefore, peripheral light which is light radiated from a semiconductor-type light source, the peripheral light being radiated outside of the vehicle, in other words, peripheral light that is not utilized as a lateral scattering light distribution pattern, can be efficiently utilized as a light distribution pattern for high beam.

A vehicle headlamp according to the second aspect of the present invention is provided in such a manner that when a light control member is positioned in a first location, a light shading portion shades a part of light from a semiconductor-type light source, the remaining light is not transmitted through a light transmission portion, is made to a lens as it is, and from the lens, the incident light is illuminated forward of a vehicle, as a light distribution pattern for low beam, or alternatively, when the light control member is positioned in a second location, a part of the light from the semiconductor-type light source is changed in optical path by means of the light transmission portion, and the remaining light from the semiconductor-type light source is caused to be incident to a lens as it is, and from the lens, the incident light is illuminated forward of the vehicle, as a light distribution pattern for high beam. As a result, a lamp unit of a lens direct emission and light distribution type is capable of further reliably obtaining a light distribution pattern for low beam and a light distribution pattern for high beam.

Further, the vehicle headlamp according to the second aspect oft the present invention is provided in such a manner that an optical path of a part of the light from the semiconductor-type light source is changed by means of the light transmission portion; and therefore, the light radiated from the semiconductor-type light source can be reliably efficiently utilized as a light distribution pattern for high beam.

A vehicle headlamp according to the third aspect of the present invention is provided in such a manner that when a light control member is positioned in a first location by means of a driving member, a light shading portion is positioned between a semiconductor-type light source and an auxiliary lens portion, and is configured to shade light to be incident to the auxiliary lens from the semiconductor-type light source, whereas a light transmission portion is positioned in a location other than between the semiconductor-type light source and a main lens portion, the light from the semiconductor-type light source is caused to be directly incident to the main lens portion, and from the main lens portion, the incident light is illuminated forward of a vehicle, as a light distribution pattern for low beam. In addition, the vehicle headlamp according to the third aspect of the present invention is provided in such a manner that when the light control member is positioned in a second location by means of the driving member, the light transmission portion is positioned between the semiconductor-type light source and the main lens portion, and the light from the semiconductor-type light source is transmitted through the light transmission portion, and from the main lens portion, the thus transmitted light is illuminated forward of the vehicle, as a light distribution pattern for high beam, whereas the light shading portion is positioned in a location other than between the semiconductor-type light source and the auxiliary lens portion, the light from the semiconductor-type light source is caused to be incident to the auxiliary lens portion, and from the auxiliary lens portion, the incident light is illuminated as a light distribution pattern for spot, forward of the vehicle and to a substantial center part of a light distribution pattern for high beam that is illuminated from the main lens portion. In this manner, the vehicle headlamp according to the third aspect of the present invention is capable of obtaining a light distribution pattern for low beam and a light distribution pattern for high beam.

Further, the vehicle headlamp according to the third aspect of the present invention is provided in such a manner that with respect to a single semiconductor-type light source, means for forming a light distribution pattern for low beam is a main lens portion, means for forming a light distribution pattern for high beam is a light transmission portion and a main lens portion, and these two means are substantially identical to each other, thus making it possible to easily obtain both of an optimal light distribution pattern for low beam and an optimal light distribution pattern for high beam.

Furthermore, the vehicle headlamp according to the third aspect of the present invention is provided in such a manner that light from the semiconductor-type light source is transmitted through the light transmission portion and the main lens portion to thereby form a light distribution pattern for high beam; and therefore, attenuation of light is reduced more remarkably in comparison with the conventional vehicle headlamp of Japanese Unexamined Patent Application Publication No. 2011-113732 configured to reflect light from a light source on a first reflection surface and a second reflection surface and then form a light distribution pattern for cruising beam, thereby making it possible to obtain a light distribution pattern for high beam with its appropriate brightness and high efficiency.

A vehicle headlamp according to the fourth aspect of the present invention is provided in such a manner that when a light shading portion is positioned in a first location, the light shading portion is positioned in the foregoing region (refer to FIG. 9(A)), and is vertical or is substantially vertical with respect to a light emission surface of a semiconductor-type light source. Thus, it becomes possible to reduce an optical loss of a light distribution pattern associated with a case in which a part of light incident to an incidence surface of a lens from the light emission surface of the semiconductor-type light source is shaded by means of a light transmission portion. In other words, it becomes possible to reduce an angle that is formed by a line segment that connects a light shading start point of the incidence surface of the lens and a most distant point of the light emission surface of the semiconductor-type light source and a line segment that connects an edge of the light shading portion in contact with the abovementioned line segment and a most proximal point of the light emission surface of the semiconductor-type light source (refer to FIG. 9(A)), and the optical loss can be reduced accordingly.

Further, the vehicle headlamp according to the fourth aspect of the present invention is provided in such a manner that when the light shading portion is positioned in the first location, the light shading portion is positioned in the abovementioned region (refer to FIG. 9(A)); and therefore, a part of the light incident from the light emission surface of the semiconductor-type light source to the incidence surface of the lens can be shaded more reliably by means of the light shading portion.

A vehicle headlamp according to the fifth aspect of the present invention is provided in such a manner that when a plate-shaped light shading portion is positioned in a second location, the light shading portion is housed in a housing groove portion of a mount member to which a semiconductor-type light source is fixed. As a result, a lamp unit that is made of the semiconductor-type light source, a lens, a light emitting portion, a driving member, and a mount member can be housed in a range of the mount member, and the lamp unit can be reduced in size.

DESCRIPTION OF THE PREFERRED EMBODIMENTS

Figure 21:
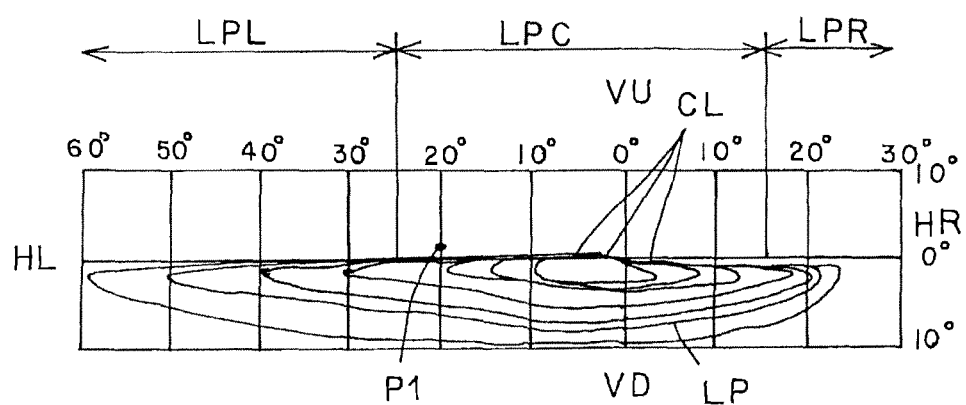
FIG. 21 is an explanatory view showing a light distribution pattern for low beam and a light distribution pattern for high beam that are illuminated from a left side lamp unit.
Figure 21:
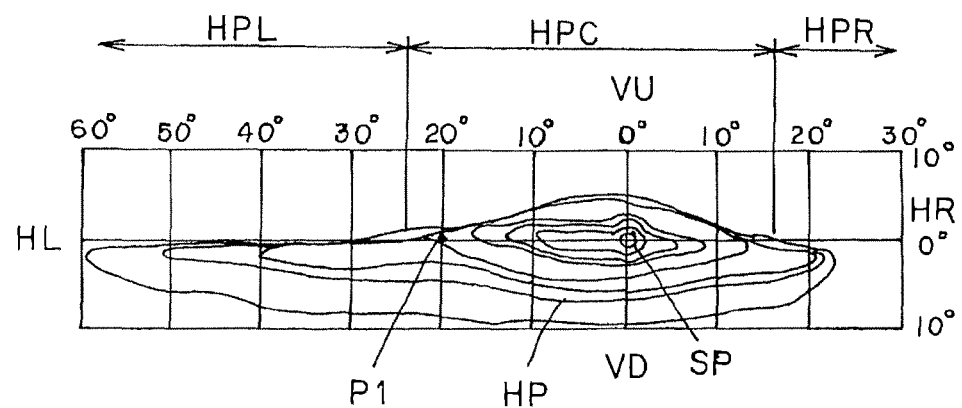
Figure 25:
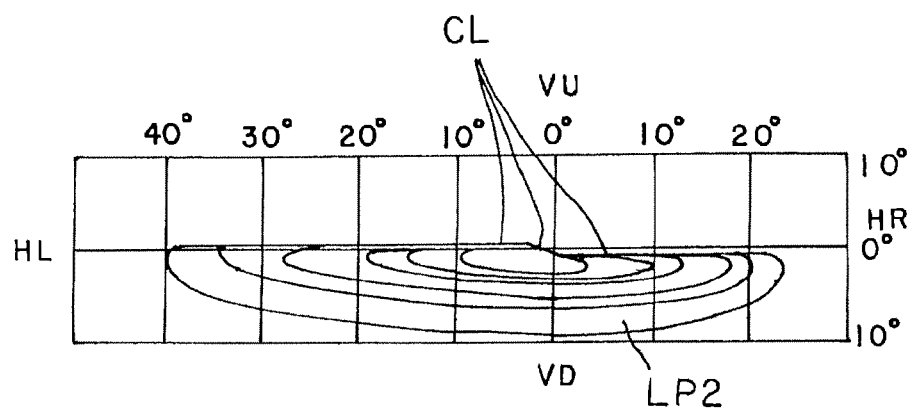
FIG. 25 is an explanatory view showing a light distribution pattern for low beam that is illuminated from the left side lamp unit.

Hereinafter, four examples of the preferred embodiments (exemplary embodiments) of vehicle headlamps according to the present invention will be described in detail with reference to the drawings. It is to be noted that the present invention is limited by the embodiments. In FIG. 21, FIG. 22, FIG. 25, FIG. 26, and FIG. 28, reference code VD-VD designates a vertical line from the top and bottom of a screen. Reference code HL-HR designates a horizontal line from the left and right of the screen. In addition, FIG. 21 and FIG. 25 are explanatory view of an equi-intensity curve schematically depicting a light distribution pattern on a screen graphically depicted by means of computer simulation. In the explanatory view of the equi-intensity curve, a central equi-intensity curve designates a high intensity, and an outside equi-intensity curve designates a low intensity. Further, in FIG. 10 and FIG. 11, hatching of a cross section of a lens is not shown. In the present specification, the terms "front, rear, top, bottom, left, and right" designate the front, rear, top, bottom, left, and right when the vehicle headlamp according to the present invention is mounted on a vehicle.

Description of Configuration in First Embodiment

Figure 1:
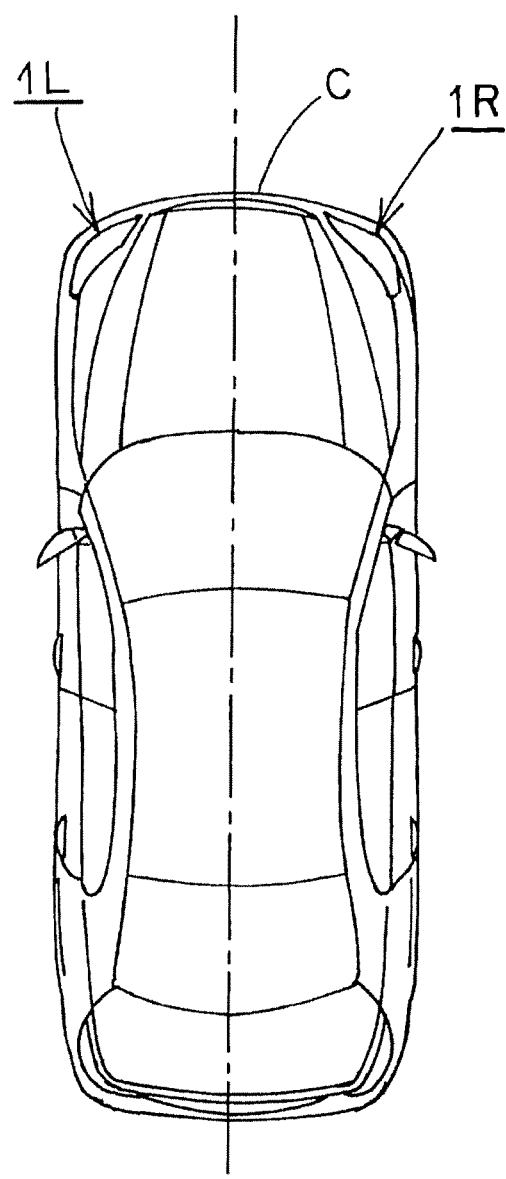
FIG. 1 shows a first embodiment of a vehicle headlamp according to the present invention, and is a plan view of a vehicle on which vehicle headlamps on both of the left and right sides are mounted.
Figure 2:
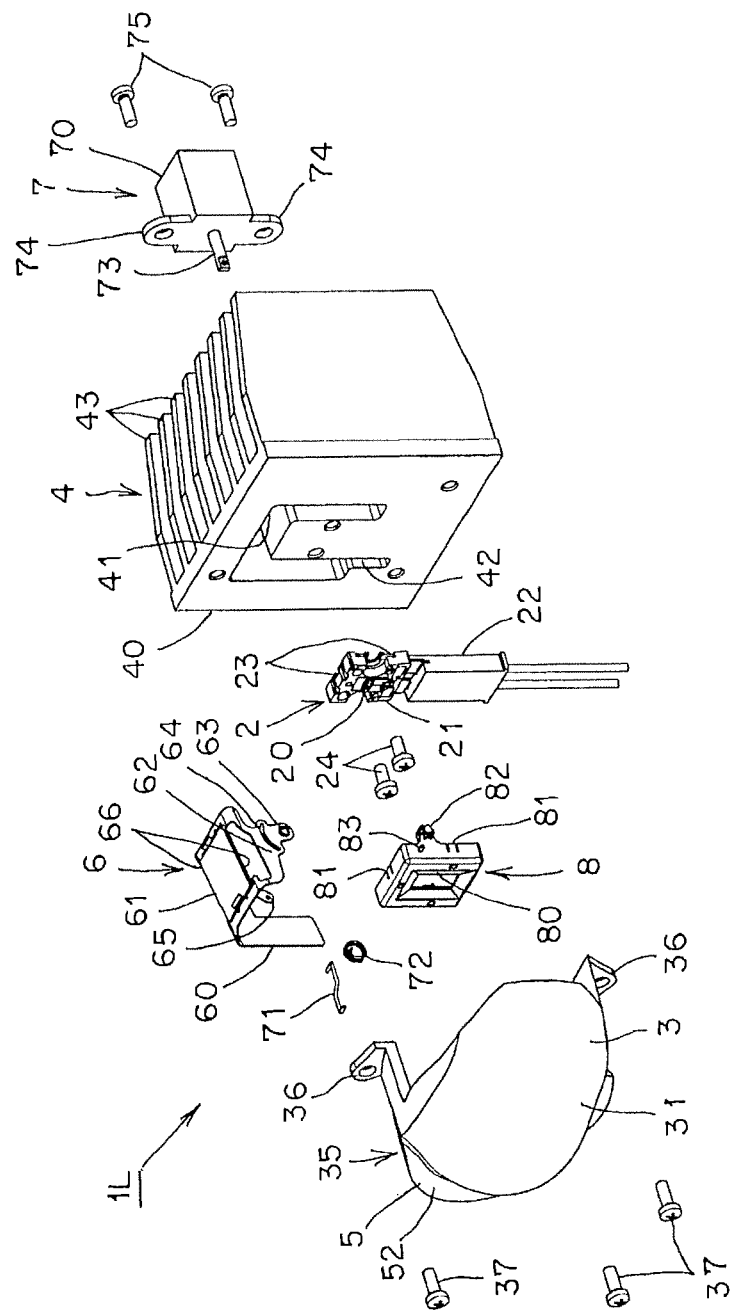
FIG. 2 is an exploded perspective view showing essential constituent elements of a left side lamp unit.
Figure 3:
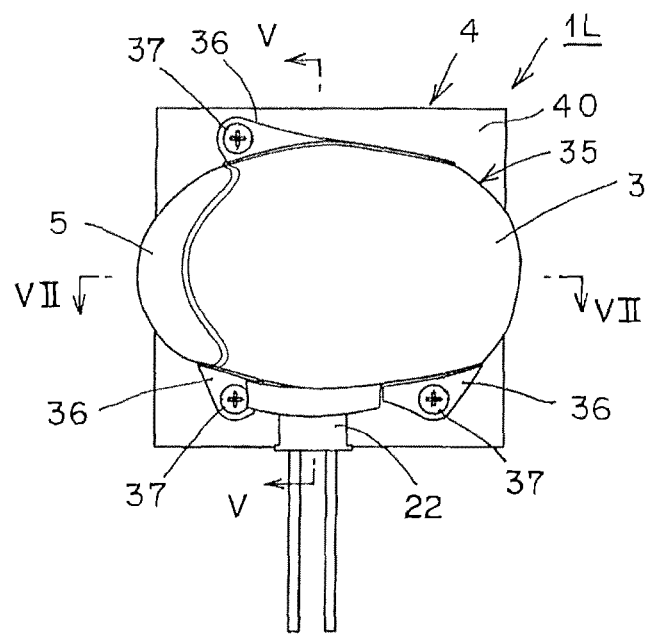
FIG. 3 is a front view showing the left side lamp unit.
Figure 4:
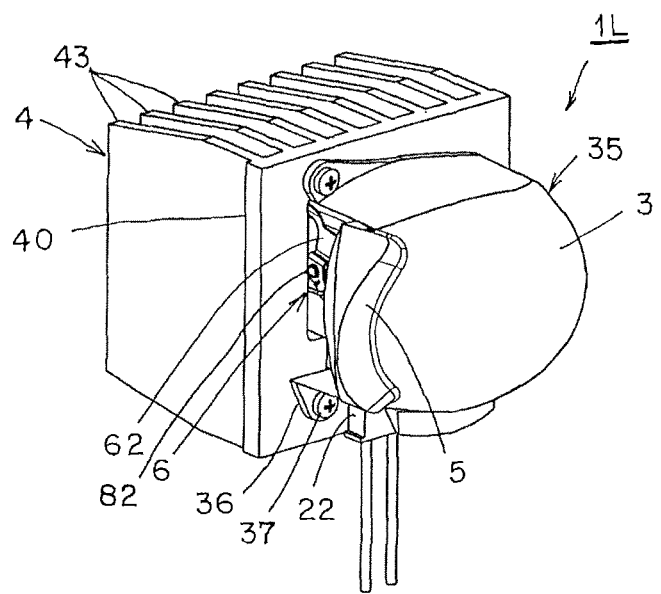
FIG. 4 is a perspective view showing the left side lamp unit.

FIG. 1 to FIG. 22 each shows a first embodiment of a vehicle headlamp according to the present invention. Hereinafter, a configuration of the vehicle headlamp according to the first embodiment will be described. In FIG. 1, reference codes 1L and 1R designate vehicle headlamps according to the first embodiment (such as headlamps, for example). The vehicle headlamps 1L and 1R are mounted at both of the left and right end part of a front part of a vehicle C. Hereinafter, the left side vehicle headlamp 1L that is mounted on the left side of the vehicle C will be described. It is to be noted that the right side vehicle headlamp 1R that is mounted on the right side of the vehicle C forms a construction that is substantially identical to that of the left side vehicle headlamp 1L; and therefore, a duplicate description is not given.

(Description of Lamp Unit)

The vehicle headlamp 1L, as shown in FIG. 2 to FIG. 8, is provided with: a lamp housing (not shown); a lamp lens (not shown); a semiconductor-type light source 2; a lens 35; a mount member 4 that is compatible with a heat sink (hereinafter, refer to as a "heat sink member"); a light control member (a movable optical part) 6; a driving member 7; and a cover member 8.

The semiconductor-type light source 2, the lens 35, the heat sink member 4, the light control member 6, the driving member 7, and the cover member 8 configure a lamp unit. The lamp housing and the lamp lens define a lamp room (not shown). The lamp unit that is made of the constituent elements that are designated by reference numerals 2, 35, 4, 6, 7, and 8 are disposed in the lamp room, and is mounted to the lamp housing via an optical axis adjustment mechanism for vertical direction (not shown) and an optical axis adjustment mechanism for transverse direction (not shown).

(Description of Semiconductor-Type Light Source 2)

The semiconductor-type light source 2 is a self-emitting light semiconductor-type light source such as an LED, an EL (an organic EL), for example, in this example, as shown in FIG. 2, FIG. 5 to FIG. 9, FIG. 11 to FIG. 13, FIG. 17, FIG. 19, and FIG. 20. The semiconductor-type light source 2 is made of a light emitting chip (an LED chip) 20; a package (an LED package) that is configured to seal the light emitting chip 20 with a sealing resin member; a board 21 that is configured to mount the package; and a connector 22 that is mounted on the board 21, and that is configured to supply a current from a power source (a battery) to the light emitting chip 20. It is to be noted that in FIG. 19 and FIG. 20, the connector 22 is not shown. Among vertical and transverse four sides of the board 21, at least three sites that constitutes top and left and right sides are those in which engagement portions 23 are provided. The board 21 is fixed to the heat sink member 4 by means of a screw 24. As a result, the semiconductor-type light source 2 is fixed to the heat sink member 4.

Figure 12:
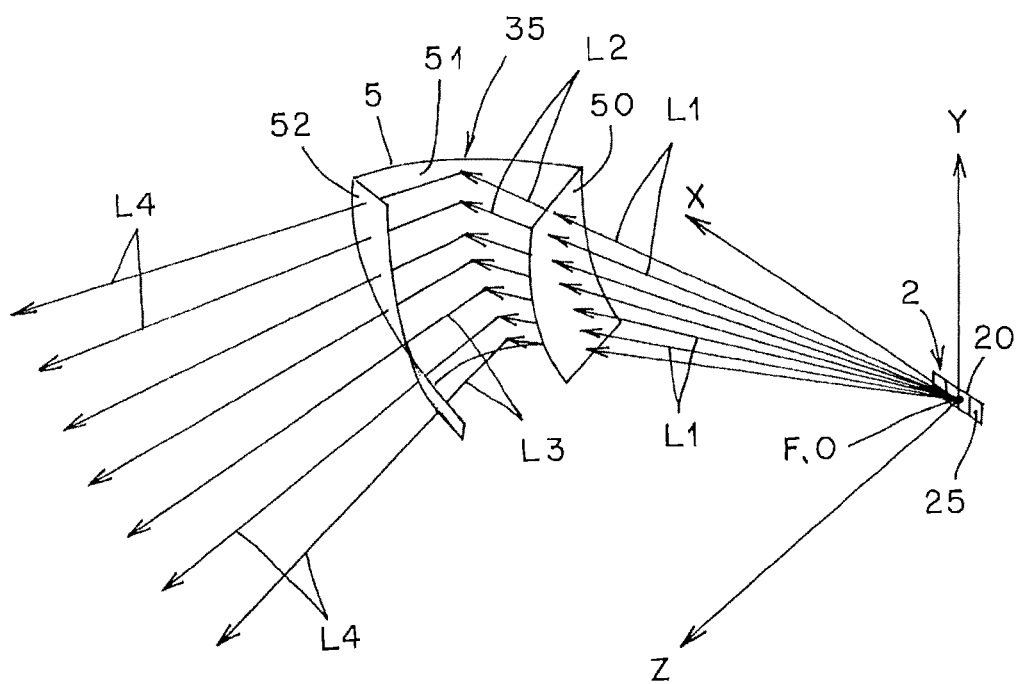
FIG. 12 is a perspective explanatory view showing the optical path of the auxiliary lens portion of the lens.
Figure 13:
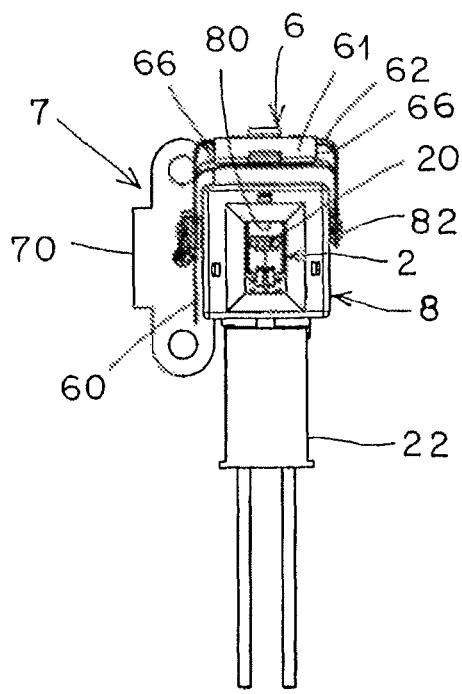
FIG. 13 is a front view showing a semiconductor-type light source, a light control member, a driving member, and a cover member when the light control member is positioned in the first location.
Figure 14:
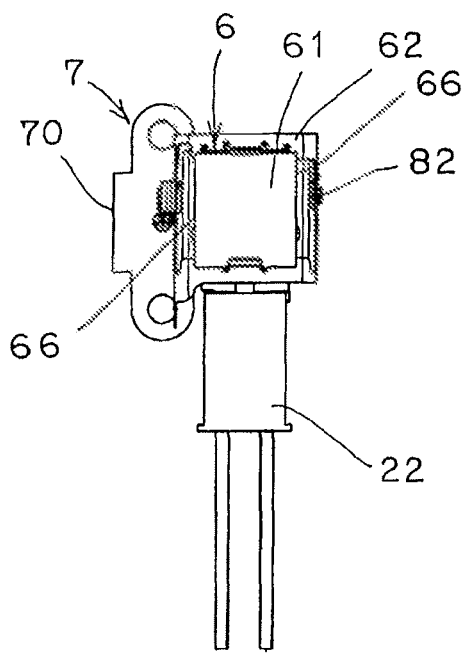
FIG. 14 is a front view showing the semiconductor-type light source, the light control member, the driving member, and the cover member when the light control member is positioned in the second location.

The light emitting chip 20 is formed in a planar rectangular shape (a flat surface elongated shape) as shown in FIG. 12. In other words, four square chips are arranged in an X axis direction (a horizontal direction). It is to be noted that two, three, or five or more square chips or one elongated chip, or one square chip may be used. A front face of the lens, in this example, a front face of an elongated shape forms a light emission surface 25. The light emission surface 25 is oriented to a front side of a reference optical axis (a reference axis) Z of the lens 35. A center O of the light emission surface 25 of the light emitting chip 20 is positioned at or near a reference focal point F of the lens 35, and is positioned on or near a reference optical axis Z of the lens 35.

In FIG. 12, the X, Y, and Z axes configure a quadrature coordinate (an X-Y-Z quadrature coordinate system). The X axis designates a horizontal axis in a transverse direction passing through the center O of the light emission surface 25 of the light emitting chip 20, and inside of the vehicle C, in other words, in the first embodiment, the right side designates a positive direction, and the left side designates a negative direction. In addition, the Y axis designates a vertical axis in a vertical direction passing through the center O of the light emission surface 25 of the light emitting chip 20, and in the first embodiment, the upper side designates a positive direction, and the lower side designates a negative direction. Further, the Z axis designates a normal line (a perpendicular line) passing through the center O of the light emission surface 25 of the light emitting chip 20, in other words, an axis in a forward/backward direction that is orthogonal to the X axis and the Y axis, and in the first embodiment, the front side designates a positive direction, and the rear side designates a negative direction.

(Description of Cover Member 8)

The cover member 8 is formed in the shape of an elongated cover in a front view, the elongated cover having a window portion 80 at its center part, as shown in FIG. 2, FIG. 5 to FIG. 7, FIG. 13, and FIG. 15 to FIG. 18. The cover member 8 is made of a light impermeable member, for example. Elastic engagement claws 81 are integrally provided at the three sites that constitute the top and left and right sides of the cover member 8. The elastic engagement claw 81 is elastically engaged with the engagement portion 23. As a result, the cover member 8 is integrally fixed to the semiconductor-type light source 2. It is to be noted that in a state in which the semiconductor-type light source 2 is sandwiched between the cover member 8 and the heat sink member 4, the cover member 8 may be fixed to the heat sink member 4 by means of a screw, or alternatively, the semiconductor-type light source 2 may be fixed in such a manner as to be sandwiched between the cover member 8 and the heat sink member 4.

The window portion 80 of the cover member 8 is positioned in correspondence with the light emission surface 25 of the light emitting chip 20 of the semiconductor-type light source 2. At least one portion other than the window portion 80 of the cover member 8 covers the periphery of the light emitting chip 20 of a front face of the board 21 of the semiconductor-type light source 2. As a result, the light that is radiated from the light emission surface 25 of the light emitting chip 20 of the semiconductor-type light source 2 can be caused to be incident to the side of the lens 35 without being shaded by means of a portion other than the window portion 80 of the cover member 8, through the window portion 80 of the cover member 8. In addition, of the front face of the board 21 of the semiconductor-type light source 2, the periphery of the light emitting chip 20 is covered with the at least one portion other than the window portion 80 of the cover member 8. As a result, its related appearance is improved.

On both of the left and right sides of the cover member 8, circular axes 82 are integrally provided in such a manner as to be parallel to or is substantially parallel to the X axis direction. At least on either one of the left and right sides of the cover member 8 (on the left side in this example) and in proximal to the axes 82, pins 83 are integrally provided in such a manner as to be parallel to or is substantially parallel to the X axis direction.

(Description of Lens 35)

The lens 35 is made of: a main lens portion 3; an auxiliary lens portion 5; and a plurality of, in this example, three fixing leg portions 36, as shown in FIG. 2 to FIG. 12. It is to be noted that the double dotted chain line in FIG. 10 and FIG. 11 designates a boundary between the main lens portion 3 and the auxiliary lens portion 5. The fixing leg portions 36 are fixed to the heat sink member 4 by means of a screw 37. As a result, the lens 35 is fixed to the heat sink member 4. The fixing leg portion 36 is structured in such a manner as to be integrated with the lens 35 in this example, whereas this fixing leg portion may be structured in such a manner as to be separated from the lens 35.

(Description of Main Lens Portion 3)

Figure 11:
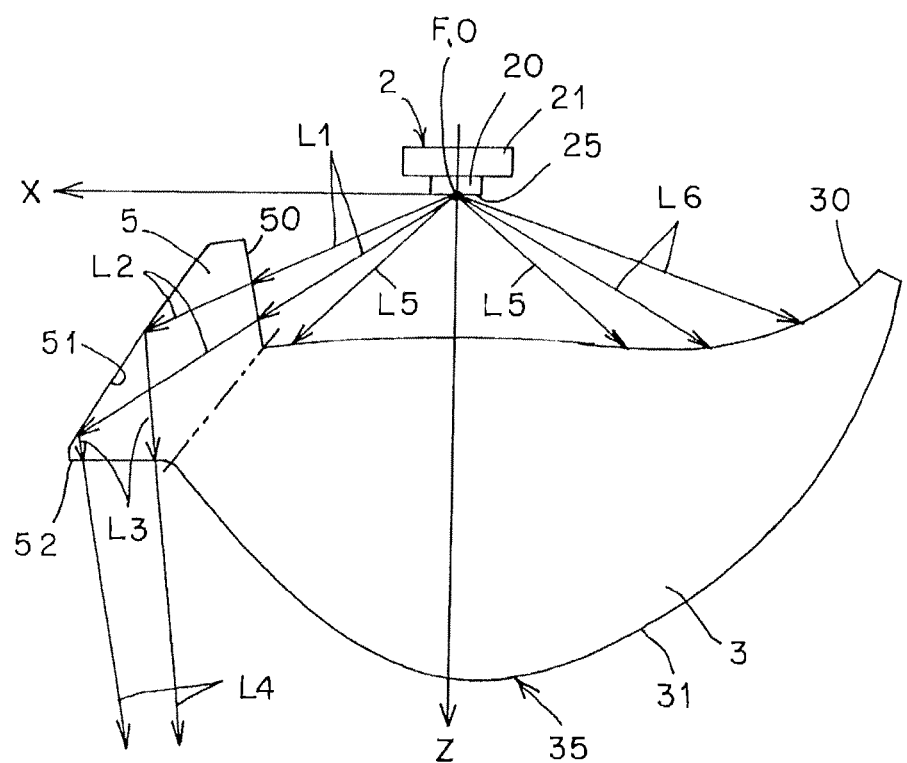
FIG. 11 is a sectional explanatory view showing the optical path of the auxiliary lens portion of the lens.

The main lens portion 3 has the reference optical axis Z and the reference focal point F, as shown in FIG. 11. The main lens portion 3 utilizes center light L5 and a part L6 of peripheral light of the light beams that are radiated from the semiconductor-type light source 2. The center light L5 is a light beam with a predetermined angle (about 40 degrees in this example) from the X axis or Y axis in a hemispheric radiation range of the semiconductor-type light source 2, and is a light beam that is caused to be incident to a center part of the main lens portion 3. In addition, the peripheral light is a light beam with its predetermined angle or less (about 40 degrees in this example) from the X axis or Y axis in the hemispheric radiation range of the semiconductor-type light source 2. A part L6 of the peripheral light is a light beam that is caused to be incident to a peripheral part of the main portion lens 3. The main lens portion 3 is a lens portion of a transmission type of transmitting light from the semiconductor-type light source 2, in this example.

The main lens portion 3 illuminates the light beams from the semiconductor-type light source 2 (the center light L5 and a part L6 of the peripheral light) forward of the vehicle C as a main light distribution pattern, i.e., a light distribution pattern for low beam (a light distribution pattern for passing) LP shown in FIG. 21(A) and FIG. 22(A); and a light distribution pattern for high beam (a light distribution pattern for cruising) HP shown in FIG. 21(B) and FIG. 22(B). In other words, the main lens portion 3 is configured to emit the light beams that are caused to be directly incident from the semiconductor-type light source 2 (the center light L5 and a part L6 of the peripheral light) forward of the vehicle C, as the light distribution pattern for low beam LP. This main lens portion 3 is also configured to emit the light from the semiconductor-type light source 2, the light being transmitted through the light control member 6 (the center light L5), and the light that is caused to be directly incident from the semiconductor-type light source 2 (a part L6 of the peripheral light) forward of the vehicle C, as the light distribution pattern for high beam HP.

The main lens portion 3 is made of an incidence surface 30 on which the light from the semiconductor-type light source 2 is caused to be incident into the main lens portion 3; and an emission surface 31 from which the light incident into the main lens portion 3 is emitted. The incidence surface 30 of the main lens portion 3 is made of a free curved surface or a composite quadrature curved surface. The emission surface 31 of the main lens portion 3 is formed in a convex shape that gently protrudes in such a manner as to be opposed to the semiconductor-type light source 2, and this emission surface is made of a free curved surface or a composite quadrature curved surface.

(Description of Auxiliary Lens Portion 5)

Figure 10:
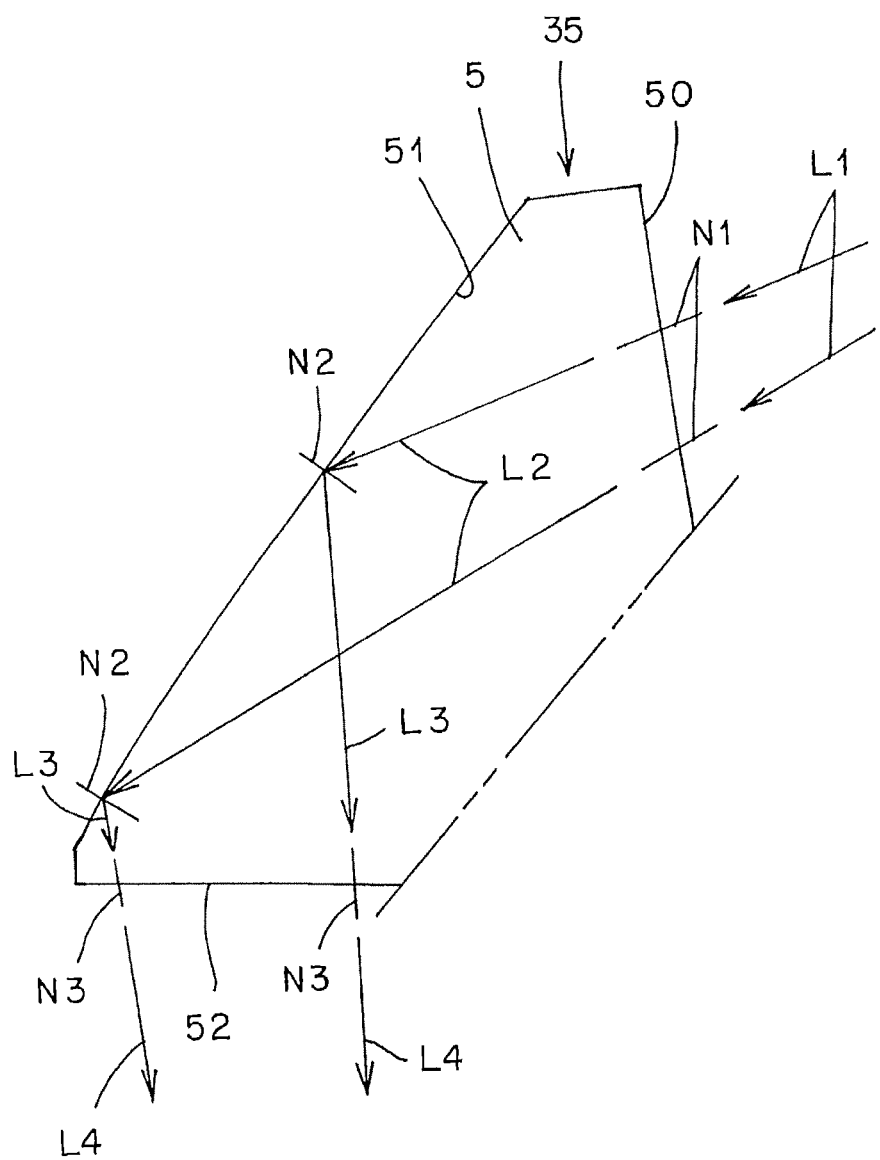
FIG. 10 is an enlarged sectional explanatory view showing an optical path of an auxiliary lens portion of a lens.

The auxiliary lens portion 5, as shown in FIG. 10 to FIG. 12, is provided on a peripheral edge of the main lens portion 3, in the first embodiment on an inside edge of the vehicle C, in other words, on a right edge. The auxiliary lens portion 5 efficiently utilizes another part L1 of the peripheral light of the light that is radiated from the semiconductor-type light source 2. Another part L1 of the peripheral light is a light beam that is caused to be incident to the auxiliary lens portion 5 of the peripheral light. The auxiliary lens portion 5, in this example, is a lens portion of a full reflection type, and is configured to fully reflect the light from the semiconductor-type light source 2 (another part L1 of the peripheral light). The auxiliary lens portion 5 is integrated with the main lens portion 3.

The auxiliary lens portion 5 is configured to illuminate the light L1 from the semiconductor-type light source 2 forward of the vehicle C and to a substantial center part of the light distribution pattern for high beam HP that is emitted from the main lens portion 3, as an auxiliary light distribution pattern, in the first embodiment, as a light distribution pattern for spot SP shown in FIG. 21(B) and FIG. 22(B).

The auxiliary lens portion 5 is made of: an incidence surface 50 on which light L1 is caused to be incident from the semiconductor-type light source 2 into the auxiliary lens portion 5; a reflection surface 51 on which light L2 that is caused to be incident from the incidence surface 50 into the auxiliary lens portion 5 is reflected; and an emission surface 52 on which reflected light L3 that is reflected on the reflection surface 51 is emitted from the inside of the auxiliary lens portion 5 to the outside.

The incidence surface 50 of the auxiliary lens portion 5 is made of a free curved surface on which a normal vector is determined in such a manner that light L1 from the semiconductor-type light source 2 is caused to be incident into the auxiliary lens portion 5 without being refracted anywhere. In other words, the incidence surface 50 of the auxiliary lens portion 5 is made of a free curved surface on which a radiation direction of light L1 from the semiconductor-type light source 2 and a direction of a normal line N1 of the incidence surface 50 of the auxiliary lens portion 5 are coincident with each other.

The reflection surface 51 of the auxiliary lens portion 5 is made of a free curved surface on which a normal vector is determined in such a manner that light L2 that is caused to be incident from the incidence surface 50 into the auxiliary lens portion 5 is fully reflected in a target angle direction on the screen of FIG. 21(B) and FIG. 22(B). In other words, the reflection surface 51 of the auxiliary lens portion 5 is made of a free curved surface on which a normal line N2 is determined in such a manner that light L2 that is caused to be incident from the incident surface 50 into the auxiliary lens portion 5 is fully reflected in a target angle direction on the screen of FIG. 21(B) and FIG. 22(B). In other words, an angle that is formed by the incident light L2 with respect to the normal line N2 of the reflection surface 51 and an angle that is formed by reflection light L3 with respect to the normal line N2 of the reflection surface 51 are equal to each other.

The emission surface 52 of the auxiliary lens portion 5 is made of a free curved surface on which a normal vector is determined in such a manner that the reflected light L3 that is fully reflected on the reflection surface 51 is emitted from the inside of the auxiliary lens portion 5 without being refracted to the outside. In other words, the emission surface 52 of the auxiliary lens portion 5 is made of a free curved surface on which a radiation direction of reflected light L3 that is fully reflected on the reflection surface 51 and a direction of a normal line N3 of the emission surface 52 of the auxiliary lens portion 5 are coincident with each other.

(Description of Heat Sink Member 4)

The heat sink member 4 is configured to radiate a heat that is generated in the semiconductor-type light source 2 to the outside. The heat sink member 4 is made of an aluminum die cast or a resin member having its appropriate heat conductivity, for example. The heat sink member 4, as shown in FIG. 2 to FIG. 8, is made of: a vertical plate portion 40; and a plurality of vertical plate-shaped fin portions 43 that are integrally provided on one surface of the vertical plate portion 40 (on a rear side surface or a rear face).

A reversely recessed housing groove portion is provided on a fixing surface that is another surface (a front side face or front face) of the vertical plate portion 40 of the heat sink member 4. In the housing groove portion, an upper horizontal housing groove portion configures a first housing groove portion 41 that serves as a first housing portion. In addition, in the housing groove portion, a lower part of a right side vertical groove portion configures a second housing groove portion 42 that serves as a second housing portion. A housing recessed portion may be employed in place of the housing groove portion. In other words, a first housing recessed portion and a second housing recessed portion may be employed in place of the first housing groove portion 41 and the second housing groove portion 42. The first housing groove portion 41 that serves as a first housing portion and the second housing groove portion 42 that serves as a second housing portion are provided in a perspective range of the lens 35 (a projection range of the lens 35 or a range of the lens 35) when the lens 35 is seen from a front face of the vehicle C.

On another surface of the vertical plate portion 40, inside of the housing groove portion, the semiconductor-type light source 2 is fixed by means of the screw 24. A part of the cover member 8 that is fixed to the semiconductor-type light source 2 and the shaft 82 are housed in vertical housing groove portions on both of the left and right sides of the housing groove portion. In addition, in another surface of the vertical plate portion 40, outside of the housing groove portion, the lens 35 is fixed by means of the screw 37.

A housing recessed portion 44 is provided at a part of a plurality of the fin portions 43 of the heat sink member 4, in other words, at an intermediate portion on the right side of a plurality of the fin portions 43. A hole 45 is provided on a bottom of the housing recessed portion 44.

(Description of Light Control Member 6)

The light control member 6 is configured in such a manner as to be changeably movable between a first location and a second location by means of the driving member 7. The first location is a location in a state shown in FIG. 2, FIG. 5, FIG. 7, FIG. 9(A), FIG. 13, FIG. 17, and FIG. 19. The second location is a location in a state shown in FIG. 6, FIG. 8, FIG. 14, FIG. 16, FIG. 18, and FIG. 20.

The light control member 6 is made of a light shading portion 60, a light transmission portion 61, and a mount portion 62. The light shading portion 60 and the mount portion 62 each are made of a light impermeable member, and are structured in such a manner as to be integrated with each other. The light transmission portion 61 is made of a light transmission member, and is structured in such a manner as to be separated from the light shading portion 60 and the mount portion 62. It is to be noted that in a state in which the light shading portion 60, the light transmission portion 61, and the mount portion 62 are integrally configured with a light transmission member, a light impermeable member may be configured in such a manner as to apply a light impermeable coating to the light shading portion 60 and the mount portion 62. In addition, the light control member 6 may be provided in such a manner that a transparent resin member and an opaque member are configured to be integrated with each other. For example, a transparent resin member of the light transmission portion 61 and an opaque resin member of the light shading portion 60 and the mount portion 62 are molded in such a manner as to be integrated with each other, or alternatively, a transparent resin member of the light transmission portion 61 is outsert-molded for an opaque steel plate of the light shading portion 60 and the mount portion 62.

The light control member 6 is rotatably mounted to the cover member 8 via the mount portion 62 between the first location and the second location, around a center axis O1 (the axis that is parallel to or is substantially parallel to the X axis) of the shaft 82. It is preferable that a rotational angle between the first location and the second location be equal to or less than 90 degrees. In this example, the angle is set to about 80 degrees. When the light control member 6 is positioned in the first location, a major part of the light control member 6 is housed in the first housing groove portion 41, and is positioned at a rear side more than another surface (a fixing surface) of the vertical plate portion 40 of the heat sink member 4.

(Description of Mount Portion 62)

The mount portion 62 is formed in a frame shape that opens at its center part. In other words, the mount portion 62 is made of both end parts in the forward/backward (vertical) direction around a center opening and left and right side parts. At a respective one of the left and right side parts of the mount portion 62, a circular through hole 63 is provided in correspondence with the shaft 82 of the cover member 8. At the left side part of the mount portion 62, an arc-shaped groove 64 is provided in correspondence with the pin 83 of the cover member 8, and are formed in an arc shape around a center of the through hole 63. At the left side part of the mount portion 62, an engagingly stop piece 65 having a small hole is integrally provided.

The shaft 82 of the cover member 8 is rotatably inserted into the through hole 63 of the mount portion 62. The pin 83 of the cover member 8 is inserted into the arc-shaped groove 64 of the mount portion 62. As a result, via the mount portion 62, the light control member 6 is rotatably mounted to the cover member 8. A part of the mount portion 62 is housed in a vertical housing groove portion on a respective one of the left and right sides of the housing groove portion of the heat sink member 4, together with a part of the cover member 8 and the shaft 82.

When the light control member 6 is positioned in the first location, the mount portion 62 is housed together with the light transmission portion 61 in a location other than between the semiconductor-type light source 2 and the main lens portion 3, in other words, in the first housing groove portion 41. When the light control member 6 is positioned in the second location, the mount portion 62 is positioned between the semiconductor-type light source 2 and the main lens portion 3, together with the light transmission portion 61. When the light control member 6 is positioned in the first location, a major part of the mount portion 62 is housed in the first housing groove portion 41, together with the light transmission portion 61, and is positioned at a rear side more than another surface (a fixing surface) of the vertical plate portion 40 of the heat sink member 4.

(Description of Light Shading Portion 60)

The light shading portion 60 is formed in the shape of a bar that is integrally provided in a vertical direction (in a forward/backward direction) at one end (at a front end or a lower end) of a right side part of the mount portion 62. The light shading portion 60 serves as a shade. When the light control member 6 is positioned in the first location, the light shading portion 60 is positioned between the semiconductor-type light source 2 and the auxiliary lens portion 5 as shown in FIG. 7, and is configured to shade light L1 that is caused to be incident from the semiconductor-type light source 2 to the incidence surface 50 of the auxiliary lens portion 5 (another part of the peripheral light).

Figure 5:
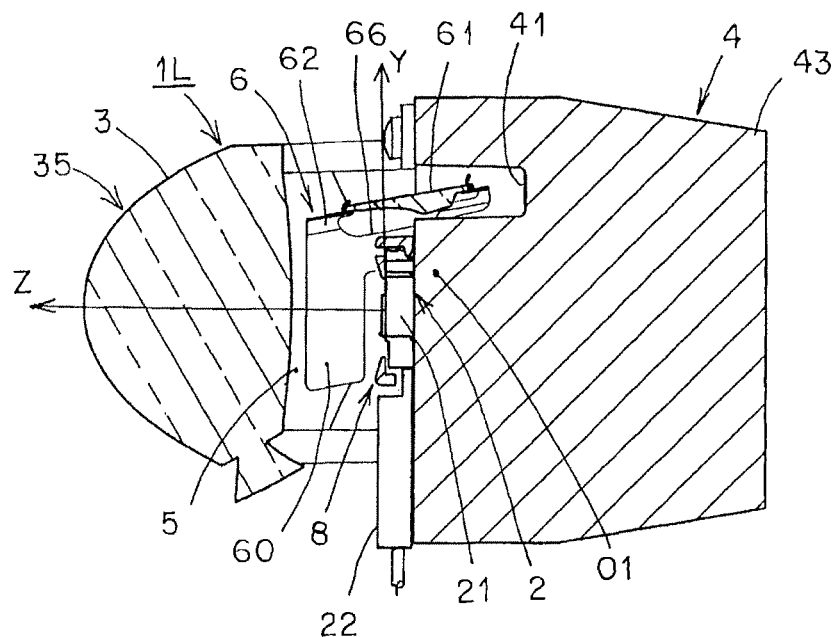
FIG. 5 is a sectional view taken along the line V-V in FIG. 3 when a light control member is positioned in a first location.
Figure 7:
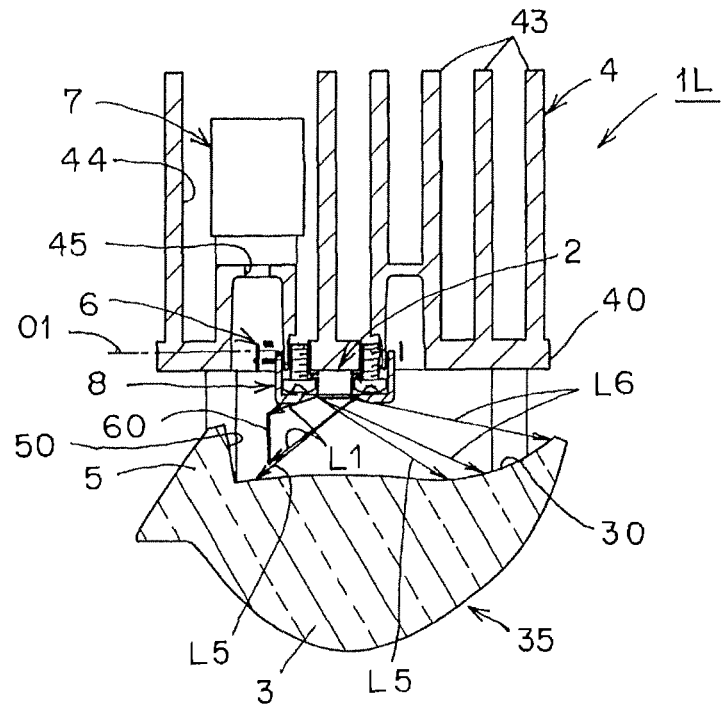
FIG. 7 is a sectional view taken along the line VII-VII in FIG. 3 when the light control member is positioned in the first location.

When the light control member 6 is positioned in the first location, the light shading portion 60 is positioned in a region (range) indicated below, as shown in FIG. 5, FIG. 7, and FIG. 9(A), and is established in a posture to be given below. In other words, the region is a region that is surrounded by: a line segment that connects a light shading start point 53 of the incidence surface 50 of the auxiliary lens portion 5 and a most distant point 26 of the light emission surface 25 of the semiconductor-type light source 2 to each other; a line segment that connects a light shading end point 54 of the incidence surface 50 of the auxiliary lens portion 5 and a most proximal point 27 of the light emission surface 25 of the semiconductor-type light source 2 to each other; a line segment 28 that is parallel to or is substantially parallel to the reference optical axis Z of the lens 35, the line segment passing through the most proximal point 27 of the light emission surface 25 of the semiconductor-type light source 2 (in other words, a line segment that is vertical or is substantially vertical to the light emission surface 25 of the semiconductor-type light source 2); and the incidence surface 50 of the auxiliary lens portion 5. The posture is vertical to or is substantially vertical to the light emission surface 25 of the semiconductor-type light source 2 (in other words, the posture is parallel to or is substantially parallel to the reference optical axis Z of the lens 35).

Figure 6:
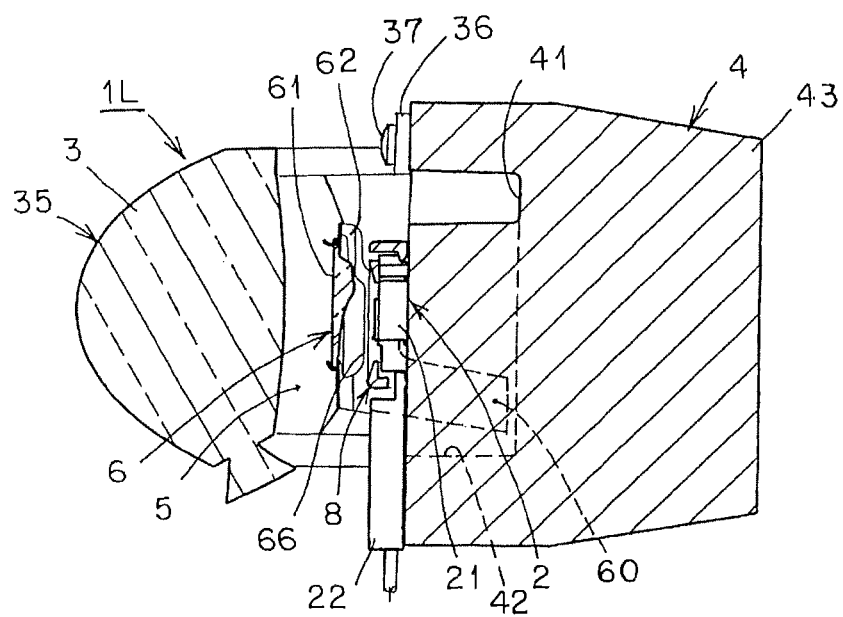
FIG. 6 is a sectional view taken along the line V-V in FIG. 3 when the light control member is positioned in a second location.
Figure 8:
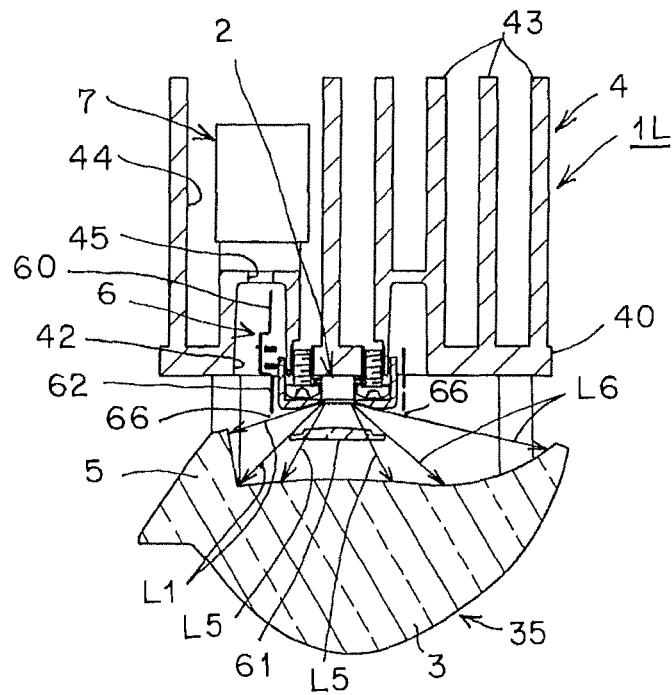
FIG. 8 is a sectional view taken along the line VII-VII in FIG. 3 when the light control member is positioned in the second location.
Figure 9:
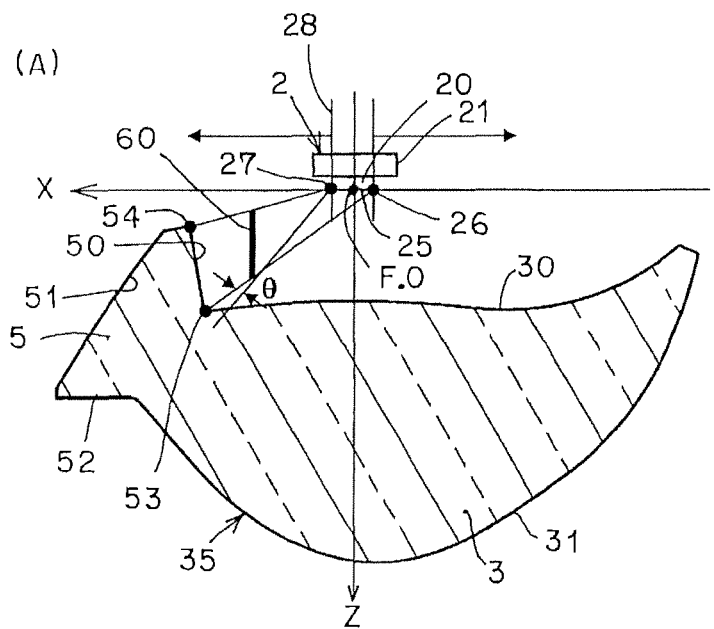
FIG. 9 is a horizontal sectional explanatory view showing a function of a light shading portion when the light control member is positioned in the first location.
Figure 9:
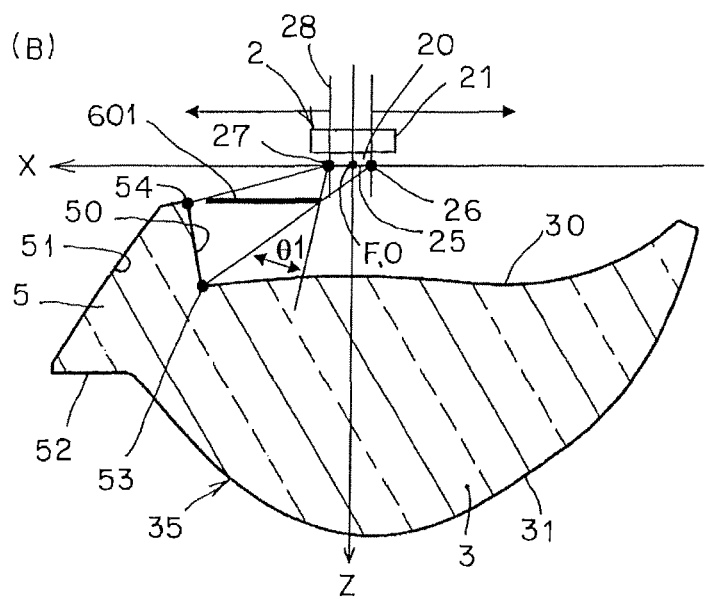

When the light control member 6 is positioned in the second location, the light shading portion 60, as shown in FIG. 6 and FIG. 8, is housed in a location other than between the semiconductor-type light source 2 and the auxiliary lens portion 5, in other words, in the second housing groove portion 42, and light L1 from the semiconductor-type light source 2 (a part of the peripheral light) is caused to be incident to the auxiliary lens portion 5. As a result, as shown in FIG. 21(B) and FIG. 22(B), the light distribution pattern for spot SP is illuminated forward of the vehicle C and to a substantial center part of the light distribution pattern for high beam HP that is emitted from the main lens portion 3. When the light control member 6 is positioned in the second location, a major part of the light shading portion 60 is housed in the second housing groove portion 42, and is positioned at a rear side more than another surface (a fixing surface) of the vertical plate portion 40 of the heat sink member 4.

(Description of Light Transmission Portion 61)

The light transmission portion 61 is formed in the shape of a plate in such a manner as to be fixed to both of forward and backward center parts of the mount portion 62. When the light control member is positioned in the first location, the light transmission portion 61, as shown in FIG. 5 and FIG. 7, is housed in a location other than between the semiconductor-type light source 2 and the main lens portion 3, in other words, in the first housing groove portion 41; and the light beams from the semiconductor-type light source 2 (the center light L5 and a part L6 of the peripheral light) are caused to be directly incident to a center part of the main lens portion 3. As a result, as shown in FIG. 21(A) and FIG. 22(A), a center portion LPC of the light distribution pattern for low beam LP is illuminated forward of the vehicle C. When the light control member 6 is positioned in the first location, a major part of the light transmission portion 61 is housed in the first housing groove portion 41, and is positioned at a rear side more than another surface (a fixing surface) of the vertical plate portion 40 of the heat sink portion 4.

When the light control member 6 is positioned in the second location, the light transmission portion 61, as shown in FIG. 6 and FIG. 8, is positioned between the semiconductor-type light source 2 and the main lens portion 3; and the light from the semiconductor-type light source 2 (the center light L5) is transmitted and then the thus transmitted light is caused to be incident to a center part of the main lens portion 3. As a result, as shown in FIG. 21(B) and FIG. 22(B), a center portion HPC of the light distribution pattern for high beam HP is illuminated forward of the vehicle C.

The light transmission portion 61, in this example, is made of a prism (refer to a prism member described in Japanese Unexamined Patent Application Publication No. 2010-153181). The light transmission portion 61, as shown in FIG. 21(A), FIG. 21(B), FIG. 22(A), and FIG. 22(B), is configured to change an optical path of the center light L5 that is caused to be incident to a center part of the main lens portion 3 among the light beams that are radiated from the semiconductor-type light source 2 and then deform a center portion LPC of the light distribution pattern for low beam LP and a center portion HPC of the light distribution pattern for high beam HP. In other words, the light transmission portion 61 is configured to form a part of the light of the center portion LPC of the light distribution pattern for low beam LP in a reverse V shape upward from a cutoff line CL of the center portion LPS of the light distribution pattern for low beam LP and then deform the center portion LPC of the light distribution pattern for low beam LP to the center portion HPC of the light distribution pattern for high beam HP. The center portion LPC of the light distribution pattern for low beam LP and the center portion HPC of the light distribution pattern for high beam HP are formed of light that is concentrated to a center.

(Description of Opening Portions 66)

Opening portions 66 are formed between both of the left and right sides of the light transmission portion 61 and both of the right and left side parts of the mount portion 62, respectively. When the light control member 6 is positioned in the first location, the opening portions 66 on both of the left and right sides are housed in a location other than between the semiconductor-type light source 2 and the main lens portion 3, in other words, in the first housing groove portion 41, together with a major part of the light transmission portion 61 and a major part of the mount portion 62.

When the light control member 6 is positioned in the second location, the opening portions 66 on both of the left and right sides, as shown in FIG. 8, are positioned between the semiconductor-type light source 2 and the main lens portion 3, together with the light transmission portion 61 and the mount portion 62, causes the light beams from the semiconductor-type light source 2 (a part L6 of the peripheral light and another part L1 of the peripheral light beam) to be transmitted as they are, and causes the thus transmitted light beams to be incident to a peripheral part of the main lens portion 3 and the auxiliary lens portion 5. As a result, as shown in FIG. 21(B) and FIG. 22(B), the light beams that are emitted from the peripheral part of the main lens portion 3 and the auxiliary lens portion 5 are illuminated forward of the vehicle C as left and light end portions HPL and HPR of the light distribution pattern for high beam HP and as the light distribution pattern for spot SP.

The opening portion 66 on the left side, as shown in FIG. 8, FIG. 21(B), and FIG. 22(B), is configured to cause a part L6 of the peripheral light from the semiconductor-type light source 2 to be transmitted as it is and then cause the thus transmitted part of the peripheral light to be incident to a peripheral part of the main lens portion 3. Therefore, the left and right end portions HPL and HPR of the light distribution pattern HP for high beam are substantially identical to the left and right end portions LPL and LPR of the light distribution pattern for low beam LP without being deformed. As a result, by means of the opening portion 66 on the left side, the left and right end portions HPL and HPR of the light distribution pattern for high beam HP can be maintained in such a manner as to be substantially identical to the left and right end portions LPL and LPR of the light distribution pattern for low beam LP.

The left and right end portions LPL and LPR of the light distribution pattern for low beam LP and the left and right end portions HPL and HPR of the light distribution pattern for high beam HP are formed of light beams (the light beams of lateral scattering light distribution patterns) that are scattered to the leftward and rightward sides (shoulder edge sides on a road surface). Here, a boundary between a respective one of the center portion LPC of the light distribution pattern for low beam LP and the center portion HPC of the light distribution pattern for high beam HP and a respective one of the left and right end portions LPL and LPR of the light distribution pattern for low beam LP and the left and right end portions HPL and HPR of the light distribution pattern for high beam HP is on the order of about 20 degrees (about 16 degrees to about 24 degrees) in the transverse and horizontal directions, as shown in FIG. 21.

(Description of Driving Member 7)

The driving member 7 is configured to cause the light control member 6 to be changeably (rotatably or turnably) positioned in the first location or the second location, as shown in FIG. 2, FIG. 7, FIG. 8, and FIG. 15 to FIG. 20. The driving member 7 is made of a solenoid 70, a connecting pin 71, and a spring 72.

The solenoid 70 is provided with a forward/backward rod 73 having a small hole. A fixing piece 74 is provided in such a manner as to be integrated with the solenoid 70. The solenoid 70 is housed in the housing recessed portion 44 of the heat sink portion 4. The forward/backward rod 73 is inserted into the hole 45 of the heat sink member 4. The fixing piece 74 is fixed to the heat sink member 4 by means of a screw 75. As a result, the driving member 7 is fixed to the heat sink member 4.

Figure 15:
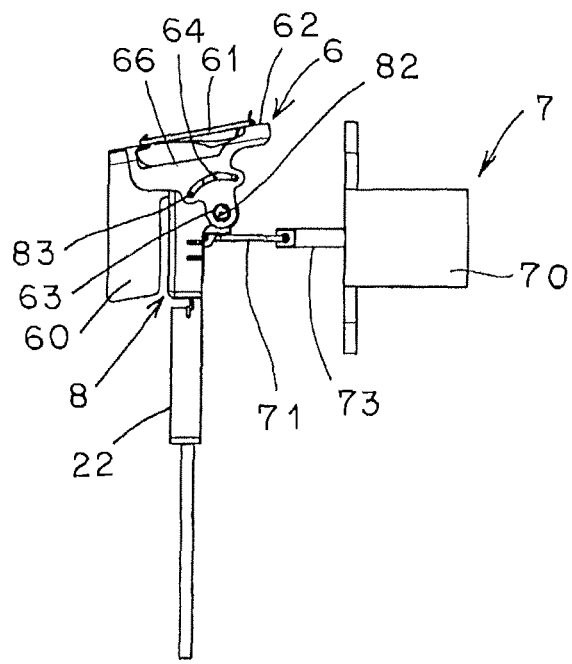
FIG. 15 is a side view showing the semiconductor-type light source, the light control member, the driving member, and the cover member when the light control member is positioned in the first location.
Figure 16:
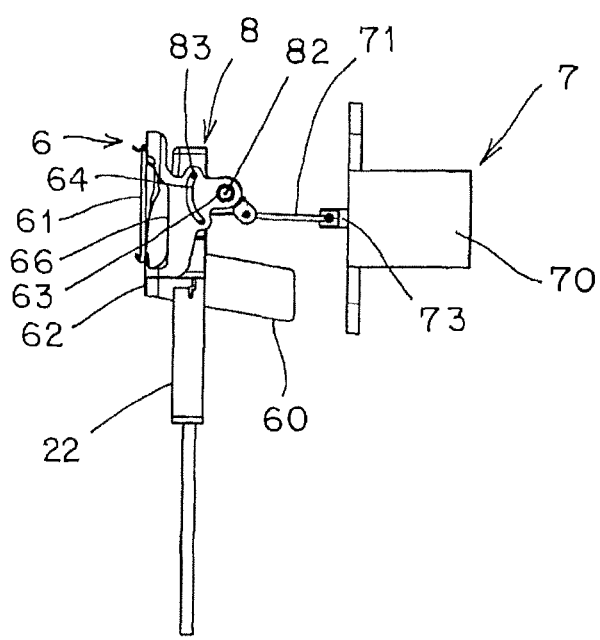
FIG. 16 is a side view showing the semiconductor-type light source, the light control member, the driving member, and the cover member when the light control member is positioned in the second location.
Figure 17:
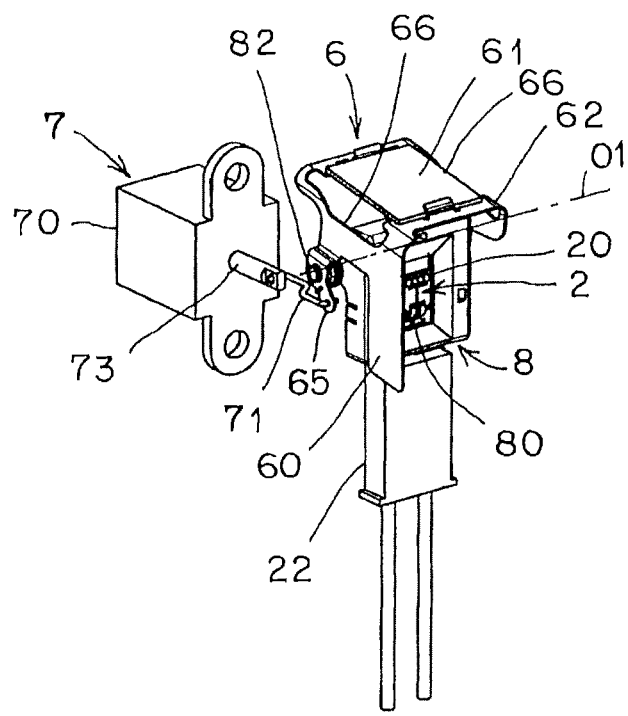
FIG. 17 is a perspective view showing the semiconductor-type light source, the light control member, the driving member, and the cover member when the light control member is positioned in the first location.
Figure 18:
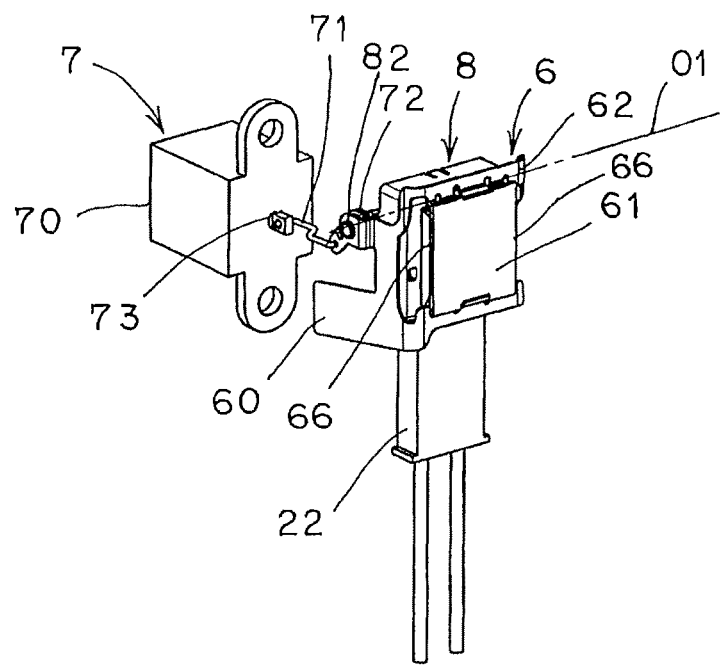
FIG. 18 is a perspective view showing the semiconductor-type light source, the light control member, the driving member, and the cover member when the light control member is positioned in the second location.
Figure 19:
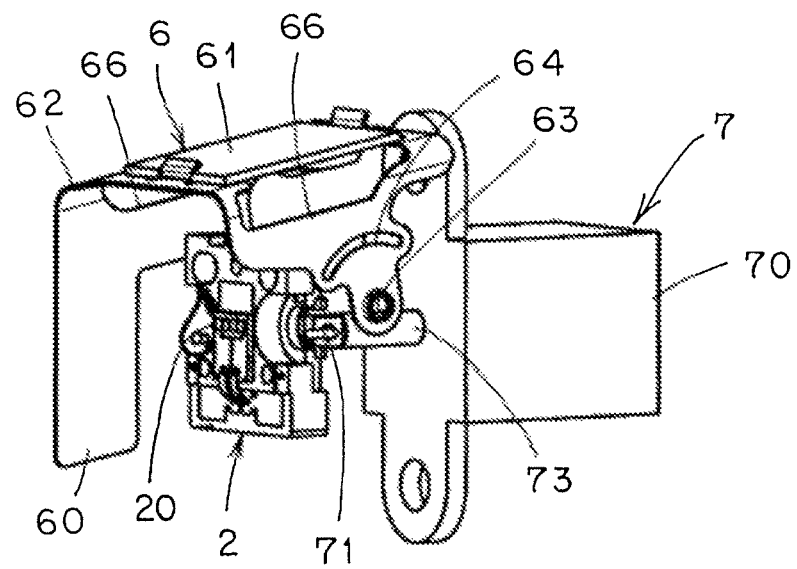
FIG. 19 is a perspective view showing the semiconductor-type light source, the light control member, the driving member, and the cover member when the light control member is positioned in the first location.
Figure 20:
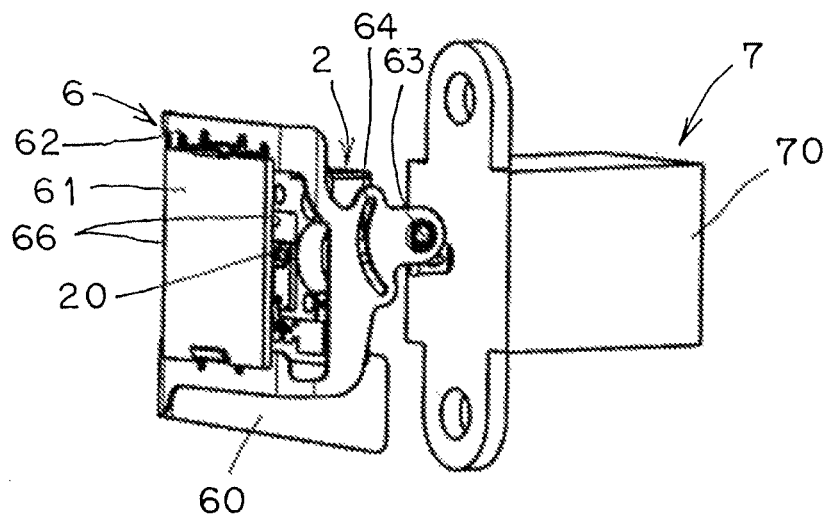
FIG. 20 is a perspective view showing the semiconductor-type light source, the light control member, and the driving member when the light control member is positioned in the second location.

Both ends of the connecting pin 71 are respectively mounted to the engagingly stop piece 65 of the light control member 6 and the forward/backward rod 73. Both ends of the spring 72 are respectively mounted to the light control member 6 as a rotating side (a movable side) and the cover member 8 as a stationary side. As a result, when no power is supplied to the solenoid 70, as shown in FIG. 15, FIG. 17, and FIG. 19, by means of a spring force of the spring 72, the forward/backward rod 73 is positioned in a forward position, and the light control member 6 is positioned in the first location. When power is supplied to the solenoid 70, as shown in FIG. 16, FIG. 18, and FIG. 20, the forward/backward rod 73 moves back against the spring force of the spring 72 and then is positioned in a backward location, and the light control member 6 is positioned in the second location.

Description of Function in First Embodiment

The vehicle headlamps 1L and 1R according to the first embodiment are made of the constituent elements as described above, and hereinafter, its related functions will be described.

When no operation is made, in other words, when no power is supplied to the solenoid 70, the forward/backward rod 73 is positioned in the forward location, and the light control member 6 is positioned in the first location by means of the spring force of the spring 72. At this time, the light shading portion 60, as shown in FIG. 7, is positioned between the semiconductor-type light source 2 and the auxiliary lens portion 5. On the other hand, a major part of the light transmission portion 61 and a major part of the mount portion 62, as shown in FIG. 5, are housed in a location other than between the semiconductor-type light source 2 and the main lens portion 3, in other words, in the first housing groove portion 41.

When no operation is made, the light emitting chip 20 of the semiconductor-type light source 2 is lit. Then, among the light beams that are radiated from the light emission surface 25 of the light emitting chip 20, the center light L5 of the semiconductor-type light source 2 and a part L6 of the peripheral light, as shown in FIG. 7, are caused to be incident from the incidence surface 30 of the main lens portion 3 into the main lens portion 3. At this time, the incident light is optically distributed and controlled in the incidence surface 30. The incident light that is caused to be incident into the main lens portion 3 is emitted from the emission surface 31 of the main lens portion 3. At this time, the emitted light is optically distributed and controlled in the emission surface 31. The emitted light from the main lens portion 3, as shown in FIG. 21(A) and FIG. 22(A), is illuminated forward of the vehicle C as the light distribution pattern for low beam LP having the cutoff line CL.

The center light L5 of the semiconductor-type light source 2, which is caused to be incident to the center part of the main lens portion 3, is illuminated forward of the vehicle C as the left and right end portions LPL and LPR of the light distribution pattern for low beam LP. A part L6 of the peripheral light of the semiconductor-type light source 2, which is caused to be incident to the peripheral part of the main lens portion 3, is illuminated forward of the vehicle C as the center portion LPC of the light distribution pattern for low beam LP.

On the other hand, among the light beams that are radiated from the light emission surface 25 of the light emitting chip 20, the light (another part of the peripheral light) L1, which is the peripheral light L1 of the semiconductor-type light source 2, and which is to be incident to the incidence surface 50 of the auxiliary lens portion 5, as shown in FIG. 7, is shaded by means of the light shading portion 60 that is positioned between the semiconductor-type light source 2 and the incidence surface 50 of the auxiliary lens portion 5. As a result, when no operation is made, as shown in FIG. 21(A) and FIG. 22(A), the light distribution pattern for low beam LP having the cutoff line CL is illuminated forward of the vehicle C.

When the light control member 6 is positioned in the first location, the light shading portion 60, as shown in FIG. 9(A), is positioned in a predetermined region, and is vertical to or is substantially vertical to the light emission surface 25 of the semiconductor-type light source 2 (the light shading portion is parallel to or is substantially parallel to the reference optical axis Z of the lens 35). The predetermined region, as described previously, is a region that is surrounded by: a line segment that connects the light shading start point 53 of the incidence surface 50 of the auxiliary lens portion 5 and the most distant point 26 of the light emission surface 25 of the semiconductor-type light source 2 to each other; a line segment that connects the light shading end point 54 of the incidence surface 50 of the auxiliary lens portion 5 and the most proximal point 27 of the light emission surface 25 of the semiconductor-type light source 2 to each other; and a line segment 28 that is parallel to or is substantially parallel to the reference optical axis Z of the lens 35, the line segment passing through the most proximal point 27 of the light emission surface 25 of the semiconductor-type light source 2; and the incidence surface 50 of the auxiliary lens portion 5. As a result, the light shading portion 60 is capable of reliably shading the light (a part of the peripheral light) L1 that is the peripheral light L1 of the semiconductor light source 2 and that is to be incident to the incidence surface 50 of the auxiliary lens portion 5 among the light beams that are radiated from the light emission surface 25 of the light emitting chip 20.

After that, power is supplied to the solenoid 70. Then the forward/backward rod 73 moves back against the spring force of the spring 72, and is positioned in the backward location, and the light control member 6 rotates from the first location to the second location and then is positioned in the second location. In other words, the light transmission portion 61 that has been housed in the first housing groove portion 41 up to now, as shown in FIG. 6 and FIG. 8, is positioned between the semiconductor-type light source 2 and the main lens portion 3. In addition, a major part of the light shading portion 60 that has been positioned between the semiconductor-type light source 2 and the auxiliary lens portion 5 up to now is housed in the second housing groove portion 42, as shown in FIG. 6.

Among the light beams that are radiated from the light emission surface 25 of the light emitting chip 20, the center light L5 of the semiconductor-type light source 2 is then transmitted through the light transmission portion 61 and then the thus transmitted light, as shown in FIG. 8, is caused to be incident from the center part of the incidence surface 30 of the main lens portion 3 into the main lens portion 3. At this time, the incident light is optically distributed and controlled in the incidence surface 30. The incident light that is caused to be incident into the main lens portion 3 is emitted from the emission surface 31 of the main lens portion 3. At this time, the emitted light is optically distributed and controlled in the emission surface 31. The emitted light from the main lens portion 3, as shown in FIG. 21(B) and FIG. 22(B), is illuminated forward of the vehicle C as the center portion HPC of the light distribution pattern for high beam HP.

The light transmission portion 61 is configured to form a part of the light of the center portion LPC of the light distribution pattern for low beam LP in a reverse V shape upward from the cutoff line CL of the center portion LPC of the light distribution pattern for low beam LP and then deform from the center portion LPC of the light distribution pattern for low beam LP to the center portion HPC of the light distribution pattern for high beam HP. As a result, the center portion LPC of the light distribution pattern for low beam LP shown in FIG. 21(A) and FIG. 22(A) is deformed by means of the light transmission portion 61, and the deformed center portion is illuminated forward of the vehicle C as the center portion HPC of the light distribution pattern for high beam HP shown in FIG. 21(B) and FIG. 21(B).

Thus, the center portion LPC of the light distribution pattern for low beam LP shown in FIG. 21(A) and FIG. 22(A) fails to include a location P1 at an upper end of a guardrail on a left side shoulder edge of a road that is about 5 m forward from the vehicle C. On the other hand, the center portion HPC of the light distribution pattern for high beam HP shown in FIG. 21(B) and FIG. 22(B) includes the location P1 at the upper end of the guardrail of the left side shoulder edge that is 5 m forward from the vehicle C. As a result, it becomes possible to obtain a sense of moderation in switching between the light distribution pattern for low beam LP shown in FIG. 21(A) and FIG. 22(A) and the light distribution pattern for high beam HP shown in FIG. 21(B) and FIG. 22(B).

On the other hand, among the light beams that are radiated from the light emission surface 25 of the light emitting chip 20, a part L6 of the peripheral light of the semiconductor-type light source 2, as shown in FIG. 8, passes through the left side opening portion 66 of the mount portion 62 and then is caused to be incident from the peripheral part of the incidence surface 30 of the main lens portion 3 into the main lens portion 3. At this time, the incident light is optically distributed and controlled in the incidence surface 30. The incident light that is caused to be incident into the main lens portion 3 is emitted from the emission surface 31 of the main lens portion 3. At this time, the emitted light is optically distributed and controlled in the emission surface 31. The emitted light from the main lens portion 3, as shown in FIG. 21(B) and FIG. 22(B), is illuminated forward of the vehicle C as the left and right end portions HPL and HPR of the light distribution pattern for high beam HP.

A part L6 of the peripheral light from the semiconductor-type light source 2 passes through the left side opening portion 66 as it is, and then, is caused to be incident to the peripheral part of the main lens portion 3. Thus, the left and right end portions HPL and HPR of the light distribution pattern for high beam HP are substantially identical to the left and right end portions LPL and LPR of the light distribution pattern for low beam LP that is formed by a part L6 of the peripheral light from the semiconductor-type light source 2 that is caused to be incident to the peripheral part of the main lens portion 3 without being deformed by anything. As a result, by means of the left side opening portion 66, the left and right end portions HPL and HPR of the light distribution pattern for high beam HP can be maintained in such a manner as to be substantially identical to the left and right end portions LPL and LPR of the light distribution pattern for low beam LP. In other words, as shown in FIG. 22(C), as is the case in which the all of the light beams from the semiconductor-type light source 2 are switched from the light distribution pattern for low beam LP to the light distribution pattern for high beam HP1, there can hardly occur a case in which a part P2 of light is reduced in luminous intensity and then the quantity of light becomes insufficient at the left and right end portions HPL and HPR of the light distribution pattern for high beam HP1.

In addition, among the light beams that are radiated from the light emission surface 25 of the light emitting chip 20, as shown in FIG. 8, another part L1 of the peripheral light of the semiconductor-type light source 2, which has been shaded by the light shading portion 60 up to now, passes through the right side opening portion 66 of the mount portion 62 and then are caused to be incident from the incidence surface 50 of the auxiliary lens portion 5 into the auxiliary lens portion 5. At this time, the incident light L2 is optically distributed and controlled in the incidence surface 50. The incident light L2 that is caused to be incident into the auxiliary lens portion 5 is fully reflected on the reflection surface 51 of the auxiliary lens portion 5. At this time, reflected light L3 is optically distributed and controlled in the reflection surface 51. The reflected light L3 after fully reflected is emitted from the emission surface 52. At this time, emitted light L4 is optically distributed and controlled in the emission surface 52. The emitted light L4 from the auxiliary lens portion 5 fails to include a spectroscopic color, and as shown in FIG. 21(B) and FIG. 22(B), the emitted light is illuminated as the light distribution pattern for spot SP of the light distribution pattern for high beam HP, forward of the vehicle C and to a substantial center part of the light distribution pattern for high beam HP that is illuminated from the main lens portion 3.

After that, power supply to the solenoid 70 is shut down. Then, the forward/backward rod 73 moves forward by means of the spring force of the spring 72 and then is positioned in the forward location, and the light control member 6 rotates from the second location to the first location and then is positioned in the first location. In other words, the light transmission portion 61 that has been positioned between the semiconductor-type light source 2 and the main lens portion 3 up to now is housed in the first housing groove portion 41. In addition, the light shading portion 60 that has been housed in the second housing groove portion 42 up to now is positioned between the semiconductor-type light source 2 and the auxiliary lens portion 5.

Figure 22:
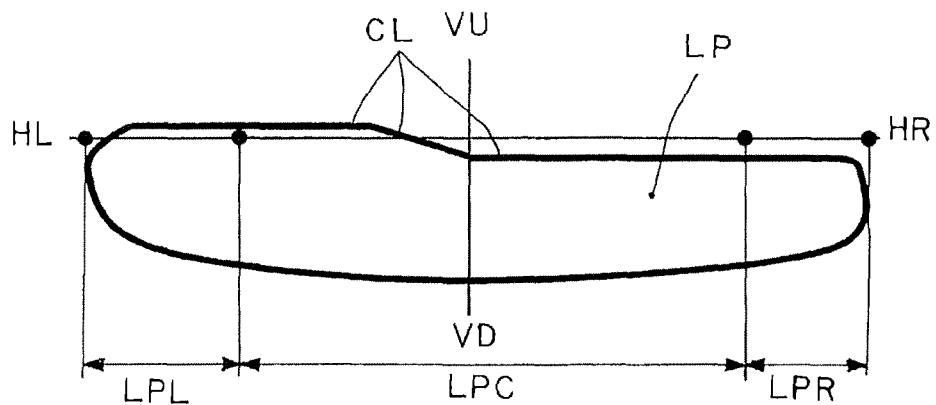
FIG. 22 is an explanatory view showing a light distribution pattern for low beam and a light distribution pattern for high beam that are respectively emitted and combined (weighted) from both of the left side lamp unit and the right side lamp unit.
Figure 22:
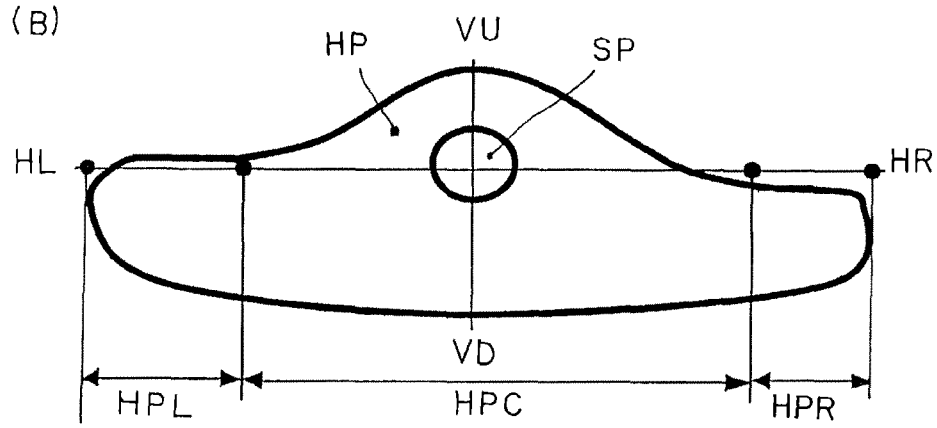
Figure 22:
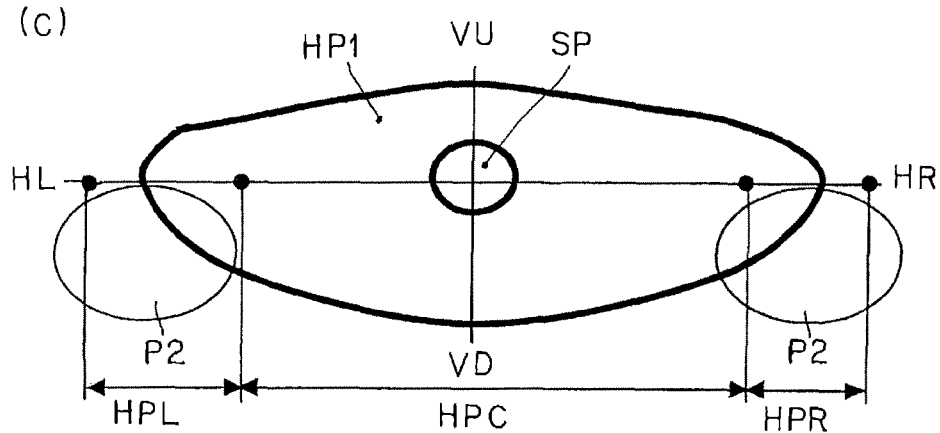

The light distribution pattern for low beam LP shown in FIG. 21(A) and the light distribution pattern for high beam HP shown in FIG. 21(B) respectively indicate light distribution patterns that are obtained by means of the left side vehicle headlamp 1L. A light distribution pattern for low beam (not shown) and a light distribution pattern for high beam (not shown), a respective one of which is obtained by means of the right side vehicle headlamp 1R, are substantially transversely symmetrical to the light distribution pattern for low beam LP shown in FIG. 21(A) and the light distribution pattern for high beam HP shown in FIG. 21(B), a respective one of which is obtained by means of the left side vehicle headlamp 1L. In other words, the outside spreads of light distribution patterns from the vehicle C are transversely symmetrical to each other, there will be no change in cutoff line, and a spot portion moves in parallel in a horizontal direction. The light distribution pattern for low beam LP shown in FIG. 22(A) and the light distribution pattern for high beam shown in FIG. 22 are then formed by weighting (combining) the light distribution pattern for low beam LP shown in FIG. 21(A) and the light distribution pattern for high beam HP shown in FIG. 21(B) with each other, a respective one of which is obtained by means of the left side vehicle headlamp 1L, and the light distribution pattern for low beam and the light distribution pattern for high beam, a respective one of which is obtained by means of the right side vehicle headlamp 1R.

Description of Advantageous Effects in First Embodiment

The vehicle headlamps 1L and 1R according to the first embodiment are made of the constituent elements and functions as described above, and hereinafter, its related advantageous effects will be described.

The vehicle headlamps 1L and 1R according to the first embodiment each are provided in such a manner that when the light control member 6 is positioned in the first location by means of the driving member 7, the light shading portion 60 is positioned between the semiconductor-type light source 2 and the auxiliary lens portion 5, and is configured to shade the light L1 that is to be incident from the semiconductor-type light source 2 to the auxiliary lens portion 5. On the other hand, the light transmission portion 61 is housed in a location other than between the semiconductor-type light source 2 and the main lens portion 3, in other words, in the first housing groove portion 41, and the light beams L5 and L6 from the semiconductor-type light source 2 are caused to be directly incident to the main lens portion 3 and then the incident light beams are illuminated forward of the vehicle C, as the light distribution pattern for low beam LP from the main lens portion 3. In addition, the vehicle headlamps 1L and 1R according to the first embodiment each are provided in such a manner that when the light control member 6 is positioned in the second location by means of the driving member 7, the light transmission portion 61 is positioned between the semiconductor-type light source 2 and the main lens portion 3, and the light L5 from the semiconductor-type light source 2 is transmitted through the light transmission portion 61, the thus transmitted light is caused to be incident to the main lens portion 3 and then the incident light is illuminated from the main lens portion 3 forward of the vehicle C, as the light distribution pattern for high beam HP (the center portion HPC of the light distribution pattern for high beam HP). On the other hand, the light shading portion 60 is housed in a location other than between the semiconductor-type light source 2 and the auxiliary lens portion 5, in other words, in the second housing groove portion 42, and the light L1 from the semiconductor-type light source 2 is caused to be incident to the auxiliary lens portion 5 and then the incident light is illuminated as the light distribution pattern for spot SP from the auxiliary lens portion 5 to the substantial center part of the light distribution pattern for high beam HP that is illuminated from the main lens portion 3. Therefore, the vehicle headlamps 1L and 1R according to the first embodiment are capable of reliably obtaining the light distribution pattern for low beam LP and the light distribution pattern for high beam HP in a lamp unit of a lens direct emission and light distribution type.

Further, the vehicle headlamps 1L and 1R according to the first embodiment each are provided in such a manner that the plate-shaped light shading portion 60 configured to switch the light distribution pattern for low beam LP and the light distribution pattern for high beam HP is disposed inside of the vehicle C. As a result, when the light distribution pattern for low beam LP is illuminated as well, the peripheral light L6 that is the light radiated from the semiconductor-type light source 2, the peripheral light being radiated to the outside of the vehicle C in the radiated peripheral light, can be widely illuminated as a lateral scattering light distribution pattern, laterally of the light distribution pattern for low beam LP (on the shoulder edge side on a road surface), in other words, to both of the left and right end portions LPL and LPR. In this manner, the light distribution pattern for low beam LP and the light distribution pattern for high beam HP can be switched in a state in which the lateral scattering light distribution pattern is maintained.

Furthermore, the vehicle headlamps 1L and 1R according to the first embodiment each are provided in such a manner that the plate-shaped light shading portion 60 is disposed inside of the vehicle C; and therefore, the peripheral light L1 that is the light radiated from the semiconductor-type light source 2, the peripheral light being radiated to the inside of the vehicle, in other words, the peripheral light L1 that is not utilized as the lateral scattering light distribution pattern can be efficiently utilized as the light distribution pattern for high beam HP, in particular, as the light distribution pattern for spot SP at the substantial center part of the light distribution pattern for high beam HP.

The vehicle headlamps 1L and 1R according to the first embodiment each are provided in such a manner that an optical path of a part L5 of the light from the semiconductor-type light source 2 is changed by means of the light transmission portion 61; and therefore, the light that is radiated from the semiconductor-type light source 2 can be reliably efficiently utilized as the light distribution pattern for high beam HP.

Still furthermore, the vehicle headlamps 1L and 1R according to the first embodiment each are provided in such a manner that means for fanning the light distribution pattern for low beam LP with respect to a single semiconductor-type light source 2 serves as the main lens portion 3, means for forming the light distribution pattern for high beam HP serves as the light transmission portion 61 and the main lens portion 3. These two means are substantially identical to each other, in other words, these two means are made of the main lens portion 3 other than the light transmission portion 61, thus making it possible to easily obtain both of an optimal light distribution pattern for low beam LP and an optimal light distribution pattern for high beam HP.

Yet furthermore, the vehicle headlamps 1L and 1R according to the first embodiment each are provided in such a manner that the light L5 from the semiconductor-type light source 2 is transmitted through the light transmission portion 61 and the main lens portion 3 to thereby form the light distribution pattern for high beam HP (the center portion HPC of the light distribution pattern for high beam HP); and therefore, attenuation of light is reduced more remarkably in comparison with the conventional vehicle headlamp of Japanese Unexamined Patent Application Publication No. 2011-113732 in which light from a light source is reflected on a first reflection surface and a second reflection surface to thereby form a light distribution pattern for cruising beam, and a light distribution pattern for high beam HP with its appropriate brightness and high efficiency can be obtained accordingly.

The vehicle headlamps 1L and 1R according to the first embodiment each are provided in such a manner that: the light L1 from the semiconductor-type light source 2 is caused to be incident from the incident surface 50 of the auxiliary lens portion 5 into the auxiliary lens portion 5 without being refracted anywhere; the light L2 that is caused to be incident from the incidence surface 50 of the auxiliary lens portion 5 into the auxiliary lens portion 5 is fully reflected in a target angle direction on the reflection surface 51 of the auxiliary lens portion 5; and the reflected light L3 that is fully reflected on the reflection surface 51 of the auxiliary lens portion 5 is emitted from the emission surface 52 of the auxiliary lens portion 5 without being refracted from the inside of the auxiliary lens portion 5 to the outside. As a result, no spectroscopic color is included in the light distribution pattern for spot SP that is formed by the light L4 that is emitted from the emission surface 52 of the auxiliary lens portion 5, in other words, from the inside of the auxiliary lens portion 5 to the outside.

The vehicle headlamps 1L and 1R according to the first embodiment are provided in such a manner that the main lens portion 3 and the auxiliary lens portion 5 of the lens 35 are integrated with each other; and therefore, a relative position precision between the main lens portion 3 and the auxiliary lens portion 5 of the lens 35 becomes high in precision, and a light distribution precision between the light distribution pattern for high beam HP that is formed by the main lens portion 3 and the light distribution pattern for spot SP that is formed by the auxiliary lens portion 5 is improved, whereas a light distribution precision between the main lens portion 3 and the auxiliary lens portion 5 of the lens 35 is facilitated. Moreover, the main lens portion 3 and the auxiliary lens portion 5 of the lens 35 are integrated with each other; and therefore, the number of parts is reduced, its related assembling property is improved, and as a result, its related manufacturing costs can be reduced.

In particular, the vehicle headlamps 1L and 1R according to the first embodiment each are provided in such a manner that when the light control member 6 is positioned in the first location, the light shading portion 60, as shown in FIG. 9(A), is positioned in a predetermined region, and is vertical to or is substantially vertical to the light emission surface 25 of the semiconductor-type light source 2. Therefore, it becomes possible to reduce an optical loss of the light distribution pattern for low beam LP associated with a case in which, among the light beams that are radiated from the light emission surface 25 of the light emitting chip 20, the light L1 that is the peripheral light L1 of the semiconductor-type light source 2, the light being to be incident to the incidence surface 50 of the auxiliary lens portion 5, is shaded by means of the light shading portion 60.

The optical loss mentioned previously, as shown in FIG. 9(A), can be expressed by an angle θ that is formed by a line segment that connects the light shading start point 53 of the incidence surface 50 of the auxiliary lens portion 5 and the most distant point 26 of the light emission surface 25 of the semiconductor-type light source 2, a line segment in contact with the above line segment, the line segment connecting an end (a front end) of the light shading portion 60 and the most proximal point 27 of the light emission surface 25 of the semiconductor-type light source 2. This angle θ (in other words, an optical loss) is reduced more remarkably in comparison with the angle θ1 (in other words, an optical loss) of the light shading portion 601 shown in FIG. 9(B). The light shading portion 601 shown in FIG. 9(B) is positioned in the predetermined region in the same manner as that described previously, and is parallel to or is substantially parallel to the light emission surface 25 of the semiconductor-type light source 2 (in other words, the shading portion is vertical to or is substantially vertical to the reference optical axis Z of the lens 35).

Moreover, the vehicle headlamps 1L and 1R according to the first embodiment each are provided in such a manner that when the light control member 6 is positioned in the first location, the light shading portion 60 is positioned in a predetermined region, as shown in FIG. 9(A); and therefore, among the light beams that are radiated from the light emission surface 25 of the light emitting chip 20, the light L1 (another part of the peripheral light) that is the peripheral light L1 of the semiconductor-type light source 2, the light being caused to be incident to the incidence surface 50 of the auxiliary lens portion 5, can be reliably shaded by means of the light shading portion 60.

In addition, the vehicle headlamps 1L and 1R according to the first embodiment each are provided in such a manner that by means of the light transmission portion 61, a part of the light of the center portion LPC of the light distribution pattern for low beam LP is formed in a reverse V shape upward from the cutoff line CL of the center portion LPC of the light distribution pattern for low beam LP, and the formed part is deformed from the center portion LPC of the light distribution pattern for low beam LP to the center portion HPC of the light distribution pattern for high beam HP. As a result, the center portion LPC of the light distribution pattern for low beam LP shown in FIG. 21(A) and FIG. 22(A) is deformed by means of the light transmission portion 61, and the thus deformed portion is illuminated forward of the vehicle C, as the center portion HPC of the light distribution pattern for high beam HP shown in FIG. 21(B) and FIG. 22(B).

Thus, the center portion LPC of the light distribution pattern for low beam LP shown in FIG. 21(A) and FIG. 22(A) fails to include the location P1 at the upper end of the guiderail on the left side shoulder edge of a road that is about 5 m forward from the vehicle C. On the other hand, the center portion HPC of the light distribution pattern for high beam HP, shown in FIG. 21(B) and FIG. 22(B), includes the location P1 at the upper end of the guiderail on the left side shoulder edge of a road that is about 5 m forward from the vehicle C. As a result, it becomes possible to obtain a sense of moderation in switching operation between the light distribution pattern for low beam LP shown in FIG. 21(A) and FIG. 22(A) and the light distribution pattern for high beam HP shown in FIG. 21(B) and FIG. 22(B).

Moreover, the vehicle headlamps 1L and 1R according to the first embodiment each are provided in such a manner that by means of the left side opening portion 66, the left and right end portions HPL and HPR of the light distribution pattern for high beam HP can be maintained in such a manner as to be substantially identical to the left and right end portions LPL and LPR of the light distribution pattern for low beam LP. As a result, there can hardly occur a case in which a part of light is reduced in luminous intensity, and the quantity of light becomes insufficient in the left and right end portions HPL and HPR of the light distribution pattern for high beam HP. In other words, as shown in FIG. 22C), if all of the light from the semiconductor-type light source is switched from the light distribution pattern for low beam to the light distribution pattern for high beam HP1, there may be a case in which a part P2 of the light is reduced in luminous intensity and the quantity of light becomes insufficient in both of the left and right end portions HPL and HPR of the light distribution pattern for high beam HP1. On the other hand, with respect to the vehicle headlamps 1L and 1R according to the first embodiment, there can hardly occur such a case in which a part of the light is reduced in luminous intensity, and the quantity of light becomes insufficient in both of the left and right end portions HPL and HPR of the light distribution pattern for high beam HP.

Further, the vehicle headlamps 1L and 1R according to the first embodiment each are provided in such a manner that as shown in FIG. 5, when the light control member 6 is positioned in the first location, a major part of the light transmission portion 61 and a major part of the mount portion 62 are housed in the first housing groove portion 41, and are positioned at a rear side than another surface (a fixed surface) of the vertical plate portion 40 of the heat sink member 4. On the other hand, as shown in FIG. 6, when the light control member 6 is positioned in the second location, a major part of the light shading portion 60 is housed in the second housing groove portion 42, and is positioned at a rear side (a fixing surface) of the vertical plate portion 40 of the heat sink member 4. As a result, the lamp unit that is made of the constituent elements that are designated by reference numerals 2, 35, 4, 6, 7, and 8 can be included in a range of another surface (a fixing surface) of the vertical plate portion 40 of the heat sink member 4, and the lamp unit that is made of the constituent elements that are designated by reference numerals 2, 35, 4, 6, 7, and 8 can be reduced in size.

Furthermore, the vehicle headlamps 1L and 1R according to the first embodiment each are provided in such a manner that the first housing groove portion 41 that serves as the first housing portion and the second housing groove portion 42 that serves as the second housing portion are provided in a perspective range of the lens 35 (in a projection range of the lens 35 or in a range of the lens 35) when the lens 35 is seen from a front face of the vehicle C. As a result, there is no need to cover the light transmission portion 61 and the mount portion 62 that are housed in the first housing groove portion 41 or the light shading portion 60 that is housed in the second housing groove portion 42, with the lens 35 or any other member. In this manner, the front view of the lens 35 or the lamp unit that is made of the constituent elements that are designated by reference numerals 2, 35, 4, 6, 7, and 8 can be reduced in size, and moreover, there is no need to providing a member for covering something, and the number of parts can be reduced, and its related manufacturing costs can be reduced accordingly.

Still furthermore, the vehicle headlamps 1L and 1R according to the first embodiment each are provided in such a manner that as shown in FIG. 5 and FIG. 7, the through hole 63 of the mount portion 62 and the shaft 82 of the cover member 8, a respective one of which serves as the rotation center (the center axis O1) of the light control member 6 that serves as a movable member, are housed in the vertical housing groove portions on both of the left and right sides that serve as housing groove portions of the heat sink member 4, and these two holes are positioned at a rear side more than another surface (a fixing surface) of the vertical plate portion 40 of the heat sink member 4. As a result, the light transmission portion 61 and the mount portion 62, of the light control member 6, can be rotated and positioned in the first housing groove portion 41 with its narrow gap and between the semiconductor-type light source 2 and the lens 35, a respective one of which has its narrow gap. In this manner, the dimensions in the vertical direction and forward/backward direction of the lamp unit that is made of the constituent elements that are designated by reference numerals 2, 35, 4, 6, 7, and 8 can be reduced, and the lamp unit that is made of the constituent elements that are designated by reference numerals 2, 35, 4, 6, 7, and 8 can be reduced in size.

The vehicle headlamps 1L and 1R according to the first embodiment each are provided in such a manner that the cover member 8 is fixed to the heat sink member 4 in such a manner as to be integrated with the semiconductor-type light source 2, and the light control member 6 is rotatably mounted to the cover member 8. As a result, dispersion in relative position between the semiconductor-type light source 2 and the light control member 6 can be reduced. In this manner, dispersion between the light distribution pattern for low beam LP and the light distribution pattern for high beam HP can be reduced, making it possible to ensure safe driving. In addition, a dimensional tolerance between the semiconductor-type light source 2 and the light control member 6 can be mitigated, its related manufacturing efficiency is improved, and its related manufacturing costs can be reduced.

In the vehicle headlamp described above, it is important to reduce an optical loss of a light distribution pattern associated with a case in which something is shaded by means of the light shading portion. However, the conventional vehicle headlamps fails to take a consideration as to means for reducing an optical loss of a light distribution pattern for side zone of a light distribution pattern associated with a case in which something is shaded by means of a movable light shading member of a light shading portion.

Therefore, the Inventor of the present invention pays an attention to the fact that it is important to reduce an optical loss of a light distribution pattern associated with a case in which something is shaded by means of the light shading portion.

The present invention provides the semiconductor-type light source 2, the lens 35, the light shading portion 60, and the driving member 7. When the light shading portion 60 is positioned in the first location, the light shading portion 60 is configured to shade a part of the light that is caused to be incident from the semiconductor-type light source 2 to the lens 35. When the light shading portion 60 is positioned in the second location, the light that is a part of the light from the semiconductor-type light source 2, the light being shaded when the light shading portion is positioned in the first location, is caused to be incident to the lens 35. When the light shading portion is positioned in the first location, the light shading portion is vertical to or is substantially vertical to the light emission surface 25 of the semiconductor-type light source 2 in a predetermined region. As a result, the present invention is capable of reducing the optical loss of the light distribution pattern associated with the case in which something is shaded by means of the light shading portion 60.

In addition, the vehicle headlamps 1L and 1R according to the first embodiment each are provided in such a manner that as shown in FIG. 6, when the light control member 6 is positioned in the second location, a major part of the light shading portion 60 is housed in the second housing groove portion 42, and is positioned at a rear side more than another surface (a fixing surface) of the vertical plate portion 40 of the heat sink member 4. As a result, the lamp unit that is made of the constituent elements that are designated by reference numerals 2, 35, 4, 6, 7, and 8 can be included in a range of another surface (a fixing face) of the vertical plate portion 40 of the heat sink member 4, and the lamp unit that is made of the constituent elements that are designated by reference numerals 2, 35, 4, 6, 7, and 8 can be reduced in size.

Description of Second Embodiment

Figure 23:
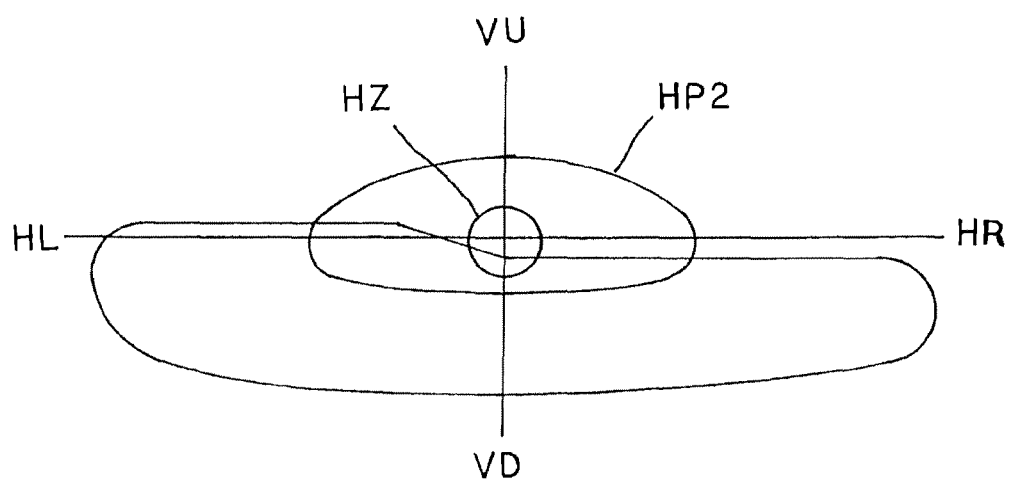
FIG. 23 is an explanatory view of a light distribution pattern for low beam and a light distribution pattern for high beam showing a second embodiment of a vehicle headlamp according to the present invention.

FIG. 23 shows a second embodiment of a vehicle headlamp according to the present invention. Hereinafter, the vehicle headlamp according to the second embodiment will be described. In the figures, like constituent elements are designated by like reference numerals shown in FIG. 1 to FIG. 22.

The vehicle headlamps 1L and 1R of the first embodiment each use a light control member 6 that is made of a light shading portion 60 and a light transmission portion 61. The vehicle headlamp according to the second embodiment uses a light control member that is made of a light shading portion.

The vehicle headlamp according to the second embodiment is made of the constituent elements described above, and hereinafter, its related functions will be described. First, when the light control member is positioned in a first location, the light shading portion is positioned between a semiconductor-type light source and a lens, and a part of light from the semiconductor-type light source is shaded, the remaining light is caused to be incident to the lens, and from the lens, the incident light is illuminated forward of a vehicle, as a light distribution pattern for low beam LP. Next, when the light control member is positioned in a second location, the light shading portion is positioned in a location between the semiconductor-type light source and the lens, the light from the semiconductor-type light source is caused to be incident to the lens as it is, and from the lens, the incident light is illuminated forward of the vehicle, as a light distribution pattern for high beam HP2 and a hot zone HZ.

The vehicle headlamp according to the second embodiment is made of the constituent elements and functions as described above, thus making it possible to achieve advantageous effects that are substantially identical to those of the vehicle headlamps 1L and 1R according to the first embodiment. In particular, the vehicle headlamp according to the second embodiment uses the optical control member that is made of the light shading portion; and therefore, its related structure is simplified, and its related manufacturing costs can be reduced accordingly, making it possible to easily switch the light distribution pattern for low beam LP and the light distribution pattern for high beam HP2.

In addition, the vehicle headlamps 1L and 1R of the first embodiment each are provided in such a manner that as shown in FIG. 6, when the light control member 6 is positioned in the second location, a major part of the light shading portion 60 is housed in the second housing groove portion 42, and is positioned at a rear side more than another surface (a fixing surface) of the vertical plate portion 40 of the heat sink member 4. As a result, the lamp unit that is made of the constituent elements that are designated by reference numerals 2, 35, 4, 6, 7, and 8 can be included in a range of another surface (a fixing surface) of the vertical plate portion 40 of the heat sink member 4, and the lamp unit that is made of the constituent elements that are designated by reference numerals 2, 35, 4, 6, 7, and 8 can be reduced in size.

Description of Third Embodiment

Figure 24:
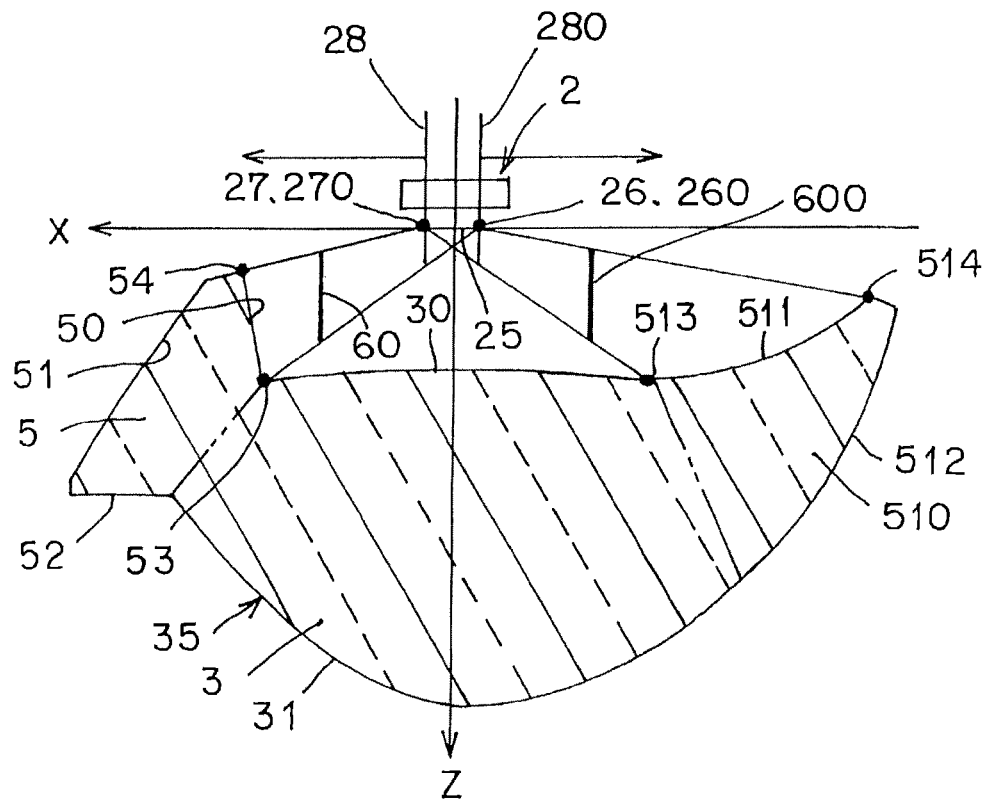
FIG. 24 shows a third embodiment of a vehicle headlamp according to the present invention, and is a horizontal sectional explanatory view that is taken when a light shading portion is positioned in the first location.
Figure 26:
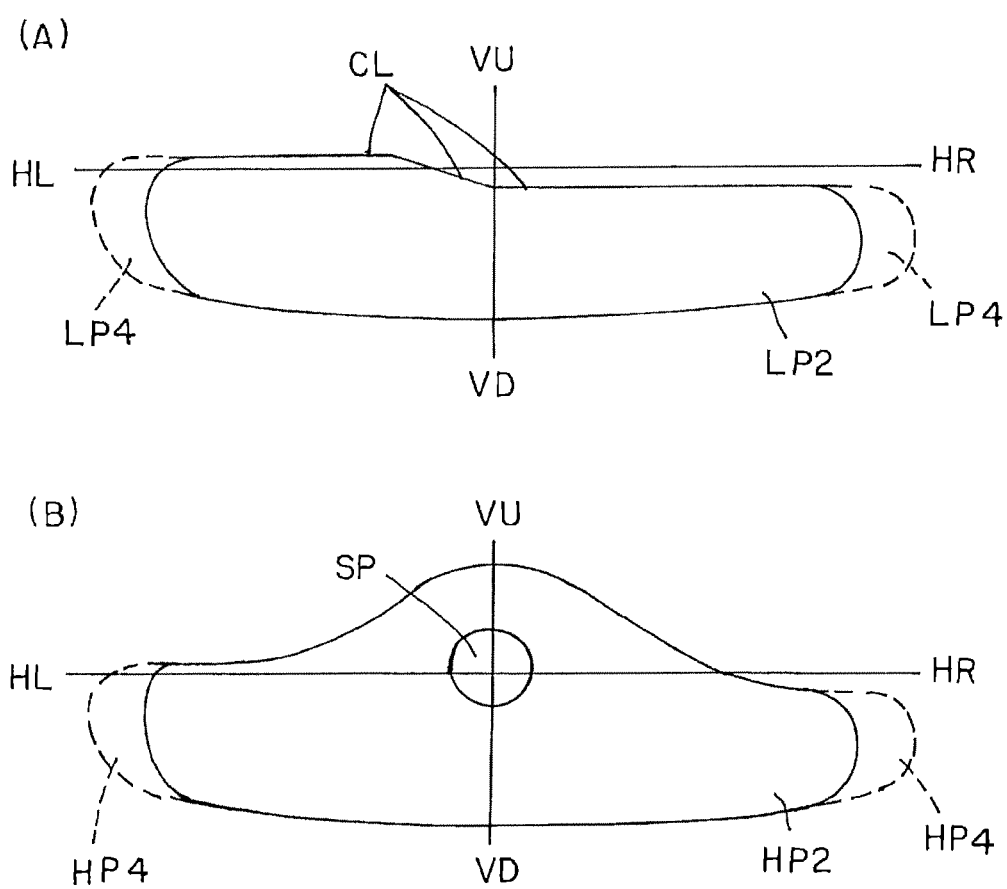
FIG. 26 is an explanatory view showing a light distribution pattern for low beam and a light distribution pattern for high beam that are respectively illuminated and combined (weighted) from a respective one the left side lamp unit and right side lamp unit.

FIG. 24 to FIG. 26 each shows a third embodiment of a vehicle headlamp according to the present invention. Hereinafter, the vehicle headlamp according to the third embodiment will be described. In the figures, like constituent elements are designated by like reference numerals shown in FIG. 1 to FIG. 23.

A lens 35 in the third embodiment is integrally made of a main lens portion 3; an auxiliary lens portion 5; and another auxiliary lens portion 510. Such another auxiliary lens portion 510 is made of an incidence surface 511 and an emission surface 512, and as indicated by the dashed line in FIG. 26, such another auxiliary lens portion is configured to form lateral scattering light distribution patterns LP4 and HP4 on both of the left and right end parts of a light distribution pattern for low beam LP2 and a light distribution pattern for high beam HP2. It is to be noted that the left side double dotted chain line in FIG. 24 indicates a boundary between the main lens portion 3 and such another auxiliary lens portion 510.

A light control member in the third embodiment is made of: a light shading portion 60; another light shading portion 600; and the light transmission portion according to the first embodiment. Such another light shading portion 600 is configured in such a manner as to be changeably movable between a first location and a second location by means of another driving member that is separated from the driving member of the first embodiment, and that is configured to switch the light shading portion 60 and a position of the light transmission portion between the first location and the second location. It is to be noted that such another driving member is made of a driving member that is similar to the driving member of the first embodiment.

When such another light shading portion 600 is positioned in the first location, such another light shading portion is positioned between a semiconductor-type light source 2 and such another auxiliary lens portion 510, and is configured to shade light that is caused to be incident from the semiconductor-type light source 2 to such another auxiliary lens portion 510. When such another light shading portion 600 is positioned in the second location, such another light shading portion is housed in a location other than between the semiconductor-type light source 2 and such another auxiliary lens portion 510, in other words, in a left side vertical housing groove portion (refer to FIG. 2) of the heat sink member of the first embodiment, and the light from the semiconductor-type light source 2 is caused to incident to such another auxiliary lens portion 510.

As is the case with the light shading portion 60, such another light shading portion 600 is positioned in the first location, as shown in FIG. 24, such another light shading portion is positioned in a region (a range) to be given below, and is established in a posture to be given below. In other words, the region is a region that is surrounded by: a line segment that connects a light shading start point 513 of the incidence surface 511 of such another auxiliary lens portion 510 and a most distant point 270 of the light emission surface 25 of the semiconductor-type light source 2 to each other; a line segment that connects a light shading end point 514 of the incidence surface 511 of such another auxiliary lens portion 510 and a most proximal point 260 of the light emission surface 25 of the semiconductor-type light source 2 to each other; a line segment 280 that is parallel to or is substantially parallel to a reference optical axis Z of the lens 35, passing through the most proximal point 260 of the light emission surface 25 of the semiconductor-type light source 2 (in other words, the line segment that is vertical to or is substantially vertical to the light emission surface 25 of the semiconductor-type light source 2); and the incidence surface 511 of such another auxiliary lens portion 510. The posture is vertical to or is substantially vertical to the light emission surface 25 of the semiconductor-type light source 2 (in other words, the posture is parallel to or is substantially parallel to the reference optical axis Z of the lens 35).

The vehicle headlamp according to the third embodiment is made of the constituent elements as described above; and therefore, as shown in FIG. 24, when a light control portion is positioned in a first location, in other words, when the light shading portion 60 is positioned between a semiconductor-type light source 2 and a main lens portion 3, and a light transmission portion is housed in a first housing groove portion, whereas another light shading portion 600 is positioned in a first location as it is, in other words, between the semiconductor-type light source 2 and another auxiliary lens portion 510, a light distribution pattern for low beam LP2 having a cutoff line CL is illuminated forward of a vehicle, as indicated by the solid line in FIG. 25 and FIG. 26(A).

When the light control portion is switched from the first location to the second position, in other words, when the light shading portion 60 is housed in the second housing groove portion and when the light transmission portion is positioned between the semiconductor-type light source 2 and the main lens portion 3, whereas another light shading portion 600 is positioned in the first location as it is, in other words, between the semiconductor-type light source 2 and another auxiliary lens 510, a light distribution pattern for high beam HP2 is illuminated forward f the vehicle, as indicated by the solid line in FIG. 26(B).

In addition, when the light control portion is positioned in the first location as it is, in other words, when the light shading portion 60 is positioned between the semiconductor-type light source 2 and the auxiliary lens portion 5 as it is, and when the light transmission portion is housed in the first housing groove portion, whereas another light shading portion 600 is housed in the second location, in other words, in the housing groove portion, a lateral scattering light distribution pattern LP4 is formed at a respective one of the left and right end parts of the light distribution pattern for low beam LP2, and the formed pattern is illuminated forward of the vehicle, as indicated by the dashed line in FIG. 26(A).

Further, when the light control portion is switched from the first location to the second location, in other words, when the light shading portion 60 is housed in the second housing groove portion, and when the light transmission portion is positioned between the semiconductor-type light source 2 and the main lens portion 3, whereas another light shading portion 600 is housed in the second location, in other words, in the housing groove portion, a lateral scattering light distribution pattern HP4 is formed at a respective one of the left and right end parts of the light distribution pattern for high beam HP2, and the formed pattern is illuminated forward of the vehicle, as indicated by the dashed line in FIG. 26(B).

The vehicle headlamp according to the third embodiment is made of the constituent elements and functions as described above, thus making it possible to advantageous effects that are substantially identical to those of the vehicle headlamps 1L and 1R according to the first embodiment.

Description of Fourth Embodiment

Figure 27:
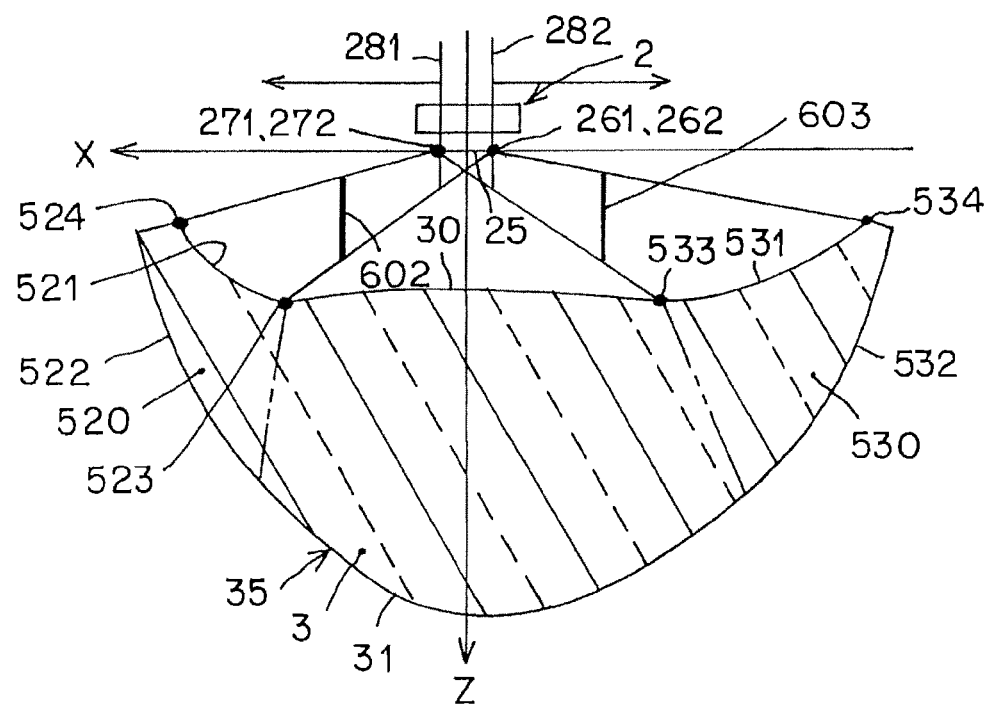
FIG. 27 shows a fourth embodiment of a vehicle headlamp according to the present invention, and is a horizontal sectional explanatory view that is taken when the light shading portion is positioned in the first location.
Figure 28:
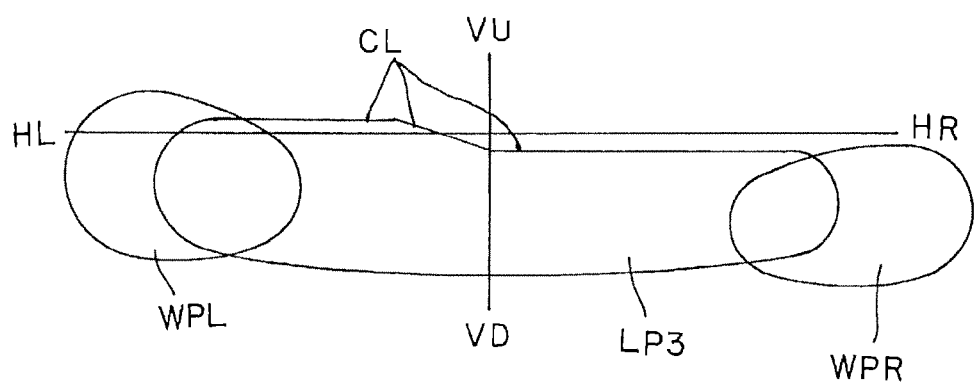
FIG. 28 is an explanatory view showing a light distribution pattern for low beam that is emitted and combined (weighted) from a respective one of the left side lamp unit and the right side lamp unit.

FIG. 27 and FIG. 28 each shows a fourth embodiment of a vehicle headlamp according to the present invention. Hereinafter, the vehicle headlamp according to the fourth embodiment will be described. In the figures, like constituent elements are designates by like reference numerals shown in FIG. 1 to FIG. 26.

A lens 35 in the fourth embodiment is integrally made of: a main lens portion 3; a first auxiliary lens portion 520; and a second auxiliary lens portion 530. The first auxiliary lens portion 520 is integrally made of an incidence surface 521 and an emission surface 522, and as shown in FIG. 28, this auxiliary lens portion is configured to form a lateral scattering light distribution pattern WPR at a right end part of a light distribution pattern for low beam LP3. The second auxiliary lens portion 530 is made of an incidence surface 530 and an emission surface 532, and as shown in FIG. 28, this auxiliary lens portion is configured to form a lateral scattering light distribution pattern WPL at a right end part of a light distribution pattern for low beam LP3. It is to be noted that the double dotted chain lines at both of the left and right sides in FIG. 27 respectively indicate a boundary between the main lens portion 3 and the first auxiliary lens portion 520 and a boundary between the main lens portion 3 and the second auxiliary lens portion 530.

A light control member in the fourth embodiment is made of a first light shading portion 602 and a third light shading portion 603. The first light shading portion 602 and the second light shading portion 603 are respectively configured in such a manner as to be changeably movable between a first location and a second location by means of two driving members that are separated from each other. It is to be noted that the driving member of the first light shading portion 602 and the driving member of the second light shading portion 603 are made of the driving members that are identical to the driving member of the first embodiment.

When the first light shading portion 602 is positioned in the first location, this light shading portion is positioned between a semiconductor-type light source 2 and the first auxiliary lens portion 520, and is configured to shade light that is caused to be incident from the semiconductor-type light source 2 to the first auxiliary lens portion 520. When the first light shading portion 602 is positioned in the second location, this light shading portion is housed in a location other than between the semiconductor-type light source 2 and the first auxiliary lens portion 520, in other words, in a right side vertical housing groove portion (refer to FIG. 2) of the heat sink member of the first embodiment, and the light from the semiconductor-type light source 2 is caused to be incident to the first auxiliary lens portion 520.

When the first light shading portion 602 is positioned in the first location, as shown in FIG. 27, this light shading portion is positioned in a region (a range) to be given below, and is established in a posture to be given below. In other words, the region is a region that is surrounded by: a line segment that connects a light shading start point 523 of the incidence surface 521 of the first auxiliary lens portion 520 and a most distant point 261 of the light emission surface 25 of the semiconductor-type light source 2 to each other; a line segment that connects a light shading end point 524 of the incidence surface 521 of the first auxiliary lens portion 520 and a most proximal point 271 of the light emission surface 25 of the semiconductor-type light source 2 to each other; a line segment 281 that is parallel to or is substantially parallel to a reference optical axis Z of the lens 35, the line segment passing through the most proximal point 271 of the light emission surface 25 of the semiconductor-type light source 2 (in other words, the line segment that is vertical to or is substantially vertical to the light emission surface 25 of the semiconductor-type light source 2); and the incidence surface 521 of the first auxiliary lens portion 520. The posture is vertical to or is substantially vertical to the light emission surface 25 of the semiconductor-type light source 2 (in other words, the posture is parallel to or is substantially parallel to the reference optical axis Z of the lens 35).

On the other hand, when the second light shading portion 603 is positioned in the first location, this light shading portion is positioned between the semiconductor-type light source 2 and the second auxiliary lens portion 530, and is configured to shade the light that is caused to be incident from the semiconductor-type light source 2 to the second auxiliary lens portion 530. When the second light shading portion 603 is positioned in the second location, this light shading portion is housed in a location other than between the semiconductor-type light source 2 and the second auxiliary lens portion 530, in other words, in a left side vertical housing groove portion (refer to FIG. 2) of the heat sink member of the first embodiment, and the light from the semiconductor-type light source 2 is caused to be incident to the second auxiliary lens portion 530.

When the second light shading portion 603 is positioned in the first location, as shown in FIG. 27, this light shading portion is positioned in a region (a range) to be given below, and is established in a posture to be given below. In other words, the region is a region that is surrounded by: a line segment that connects a light shading start point 533 of the incidence surface 531 of the second auxiliary lens portion 530 and a most distant point 272 of the light emission surface 25 of the semiconductor-type light source 2 to each other; a line segment that connects a light shading end point 534 of the incidence surface 531 of the second auxiliary lens portion 530 and a most proximal point 262 of the light emission surface 25 of the semiconductor-type light source 2 to each other; a line segment 282 that is parallel to or is substantially parallel to a reference optical axis Z of the lens 35, the line segment passing through the most proximal point 262 of the light emission surface 25 of the semiconductor-type light source 2 (in other words, the line segment that is vertical to or is substantially vertical to the light emission surface 25 of the semiconductor-type light source 2); and the incidence surface 531 of the second auxiliary lens portion 530. The posture is vertical to or is substantially vertical to the light emission surface 25 of the semiconductor-type light source 2 (in other words, the posture is parallel to or is substantially parallel to the reference optical axis Z of the lens 35).

The vehicle headlamp according to the fourth embodiment is made of the constituent elements described above; and therefore, as shown in FIG. 27, when the first light shading portion 602 is positioned in the first location, in other words, between the semiconductor-type light source 2 and the first auxiliary lens portion 520, whereas the second light shading portion 603 is positioned in the first location, in other words, between the semiconductor-type light source 2 and the second auxiliary lens portion 530, as shown in FIG. 28, a light distribution pattern for low beam LP3 having a cutoff line CL is illuminated forward of a vehicle.

In a state in which only the first light shading portion 602 is housed in a second location subsequent to its movement from the first location, in other words, in a housing groove portion, when the second light shading portion 603 is positioned in the first location as it is, in other words, between the semiconductor-type light source 2 and the second auxiliary lens portion 530, as shown in FIG. 28, the light distribution pattern for low beam LP3 and a lateral scattering light distribution pattern for right end part WPR are illuminated forward of the vehicle.

In addition, in a state in which the first light shading portion 602 is positioned in the first location as it is, in other words, between the semiconductor-type light source 2 and the first auxiliary lens portion 520, when only the second light shading portion 603 is housed in the second location subsequent to its movement from the first location, in other words, in a housing groove portion, as shown in FIG. 28, the light distribution pattern for low beam LP3 and a lateral scattering light distribution pattern for left end part WPL are illuminated forward of the vehicle.

Further, when the first light shading portion 602 and the second light shading portion 603 are housed in the second location subsequent to its movement from the first location, in other words, in a housing groove portion, as shown in FIG. 28, the light distribution pattern for low beam LP3, the lateral scattering light distribution pattern for right end part WPR, and the lateral scattering light distribution pattern for left end part WPL are illuminated forward of the vehicle.

The vehicle headlamp according to the fourth embodiment is made of the constituent elements and functions as described above, thus making it possible to achieve advantageous effects that are substantially identical to those of the vehicle headlamps according to the first embodiment to the third embodiment.

Description of Examples Other than First to Fourth Embodiments

The first to fourth embodiments have described the vehicle headlamps 1L and 1R in a case where the vehicle C is driven on a left side. However, the present invention can be applied to a vehicle headlamp in a case where the vehicle C is driven on a right side.

In the first to fourth embodiments, the main lens portion 3 and the auxiliary lens portion 5 of the lens 35, another auxiliary lens portion 510, the first auxiliary lens portion 520, and the second auxiliary lens 530 are integrated with each other. However, in the present invention, the main lens portion 3 and the auxiliary lens portion 5 of the lens 35, another auxiliary lens portion 510, the first auxiliary lens portion 520, and the second auxiliary lens 530 may be separated from each other.

Further, in the first to fourth embodiment, the auxiliary lens portion 5, another auxiliary lens portion 510, and the second auxiliary lens 530 are provided on a right edge (a left edge) of the main lens portion 3 on one-by-one piece basis, or alternatively, these lens portions are provided on both of the left and right edges of the main lens portion 3 on a one-by-one piece basis. However, in the present invention, these auxiliary lens portions may be provided on a top edge, the left edge (the right edge), and a bottom edge of the main lens portion 3. In addition, a plurality of auxiliary lens portions may be provided. In a case where a plurality of auxiliary lens portion are provided, a light distribution pattern for front side and a light distribution pattern for overhead other than a spot light distribution pattern SP, a light distribution pattern for left side, and a light distribution pattern for right side may be formed and combined with the light distribution pattern for spot SP, the light distribution pattern for left side, and the light distribution pattern for right side.

Furthermore, in the first to fourth embodiments, the light control member 6 is caused to be rotate between the first location and the second location. However, in the present invention, the light control member 6 may be caused to slide between the first location and the second location. In his case, sliding means is provided in place of a rotary shaft.

Still furthermore, in the first to fourth embodiments, the solenoid 70 is used as the driving member 7. However, in the present invention, a member other than the solenoid 70, for example, a motor or the like may be used as the driving member 7. In this case, a driving force transmission mechanism is provided between the motor and the light control member 6.

Yet furthermore, in the first to fourth embodiments, the auxiliary lens portion 5 of the lens 35 is a lens portion of a full reflection type. However, in the present invention, the auxiliary lens portion of the lens 35 may be a lens portion other than the lens portion of the full reflection type, for example, a lens portion of a refraction type or a lens portion of a Fresnel refraction type.

Furthermore, in the first to fourth embodiments, a fixing surface of another surface of the vertical plate portion 40 of the heat sink member 4 is formed in the shape of a flat surface. However, in the present invention, in a fixing surface of another surface of a vertical plate portion of a heat sink member, there may be a difference in step between a fixing surface to which a semiconductor-type light source and another fixing surface.

Still furthermore, in the first to fourth embodiments, in another surface of the vertical plate portion 40 of the heat sink member 4, in other words, in a surface that is opposed to the lens 35, the fixing face to which the semiconductor-type light source 2 is fixed and another surface are substantially flush with each other. However, in the present invention, there is a difference in step between the surface to which the semiconductor-type light source 2 is fixed and another surface. In other words, the surface to which the semiconductor-type light source 2 is fixed may be formed in a convex shape on the side of the lens 35 with respect to another surface, or alternatively, the above surface may be formed in a concave shape on an opposite side of the lens 35 conversely.

Yet furthermore, in the first to fourth embodiments, the light control member 6 that is made of the light shading portion 60 and the light transmission portion 61 are used. However, in the present invention, a light control member that is made of only a light shading portion may be used. In this case, a construction of the light control member is simplified, and a lamp unit can be reduced in size accordingly.

What is claimed is:

1. A vehicle headlamp comprising:
a semiconductor-type light source;
a lens configured to illuminate light from the semiconductor-type light source forward of a vehicle as a respective one of a light distribution pattern for low beam and a light distribution pattern for high beam;
a light control member; and
a driving member configured to position the light control member so as to be changeably movable between a first location and a second location, wherein:
the light control member is made of a plate-shaped light shading portion that is disposed inside of the vehicle;
when the light control member is positioned in the first location, the light shading portion shades a part of the light from the semiconductor-type light source, causes remaining light to be incident to the lens, and illuminate the incident light from the lens forward of the vehicle, as the light distribution pattern for low beam; and
when the light control member is positioned in the second location, the light shading portion causes the light from the semiconductor-type light source to be incident to the lens as is, and illuminates the incident light from the lens forward of the vehicle, as the light distribution pattern for high beam,
wherein:
the light control member is made of the light shading portion and a light transmission portion;
when the light control member is positioned in the first location, the light transmission portion causes the light from the semiconductor-type light source to be incident to the lens as is, and illuminates the incident light from the lens forward of the vehicle, as the light distribution pattern for low beam,
when the light control member is positioned in the second location, the light control member changes an optical path of a part of the light from the semiconductor-type light source, causes the part of the light to be incident to the lens, and illuminates the incident part of the light from the lens, as the light distribution pattern for high beam.

2. A vehicle headlamp comprising:
a semiconductor-type light source;
a lens that is made of a main lens portion and an auxiliary lens portion, a respective one of which is configured to illuminate light from the semiconductor-type light source forward of a vehicle, as a predetermined light distribution pattern;
a light control member that is made of a light shading portion and a light transmission portion; and
a driving member configured to position the light control member so as to be changeably movable between a first location and a second location, wherein:
when the light control member is positioned in the first location, the light shading portion is positioned between the semiconductor-type light source and the auxiliary lens portion, and is configured to shade light that is caused to be incident from the semiconductor-type light source to the auxiliary lens portion;
the light control member is positioned in the second location, the light shading portion is positioned in a location other than between the semiconductor-type light source and the auxiliary lens portion, and is configured to cause the light from the semiconductor-type light source to be incident to the auxiliary lens portion;
when the light control member is positioned in the first location, the light transmission portion is positioned in a location other than between the semiconductor-type light source and the main lens portion, and is configured to cause the light from the semiconductor-type light source to be directly incident to the main lens portion, and when the light control member is positioned in the second location, the light transmission portion is positioned between the semiconductor-type light source and the main lens portion, and is configured to transmit the light from the semiconductor-type light source and then cause the transmitted light to directly incident to the main lens portion;
the main lens portion is configured to illuminate the light that is caused to be directly incident from the semiconductor-type light source, forward of the vehicle, as a light distribution pattern for low beam, and illuminate the light that is transmitted through the light transmission portion from the semiconductor-type light source, forward of the vehicle, as a light distribution pattern for high beam; and
the auxiliary lens portion is configured to illuminate the light from the semiconductor-type light source, as a light distribution pattern for spot, forward of the vehicle and to a substantial center part of the light distribution pattern for high beam that is illuminated from the main lens portion.

3. A vehicle headlamp comprising:
a semiconductor-type light source having a light emission surface;
a lens configured to cause light from the light emission surface of the semiconductor-type light source to be incident by means of an incidence surface and then illuminate the incident light forward of a vehicle, as a predetermined light distribution pattern;
a light shading portion that serves as a light control member; and
a driving member configured to position the light shading portion so as to be changeably movable between a first location and a second location, wherein:
when the light shading portion is positioned in the first location, the light shading portion is configured to shade a part of light that is caused to be incident from the light emission surface of the semiconductor-type light source to the incidence surface of the lens, and when the light shading portion is positioned in the second location, the light shading portion is configured to cause a part of the light from the light emission surface of the semiconductor-type light source to be incident to the incidence surface, and when the light shading portion is positioned in the first location, the light shading portion is vertical to or is substantially vertical to the light emission surface of the semiconductor-type light source in a region that is surrounded by:

a line segment that connects a light shading start point of the incidence surface of the lens and a most distant point of the light emission surface of the semiconductor-type light source to each other;

a line segment that connects a light shading end point of the incidence surface of the lens and a most proximal point of the light emission surface of the semiconductor-type light source to each other, a line segment that is vertical to or is substantially vertical to the light emission surface of the semiconductor-type light source, the line segment passing through the most proximal point of the light emission surface of the semiconductor-type light source; and the incidence surface of the lens.

4. The vehicle headlamp according to claim 3, wherein:

the semiconductor-type light source is fixed to a mount member, a housing groove portion is provided in the mount member, and the light shading portion is formed in a shape of a plate, and when the light shading portion is positioned in the second location, the light shading portion is housed in the housing groove portion.

* * * * *